United States Patent
Tal-Gan et al.

(10) Patent No.: US 12,528,838 B2
(45) Date of Patent: Jan. 20, 2026

(54) **CYCLIC DOMINANT NEGATIVE COMPETENCE STIMULATING PEPTIDE ANALOGS AND METHODS OF TREATING *STREPTOCOCCUS* PNEUMONIAE INFECTIONS**

(71) Applicants: Nevada Research & Innovation Corporation, Reno, NV (US); The Board of Trustees of the University of Illinois, Urbana, IL (US)

(72) Inventors: Yftah Tal-Gan, Reno, NV (US); Gee W. Lau, Urbana, IL (US); Yifang Yang, Reno, NV (US)

(73) Assignees: Nevada Research & Innovation Corporation, Reno, NV (US); The Board of Trustees of the University of Illinois, Urbana, IL (US)

( * ) Notice: Subject to any disclaimer, the term of this patent is extended or adjusted under 35 U.S.C. 154(b) by 971 days.

(21) Appl. No.: 17/613,272

(22) PCT Filed: May 21, 2020

(86) PCT No.: PCT/US2020/034087
§ 371 (c)(1),
(2) Date: Nov. 22, 2021

(87) PCT Pub. No.: WO2020/237094
PCT Pub. Date: Nov. 26, 2020

(65) Prior Publication Data
US 2022/0227814 A1   Jul. 21, 2022

Related U.S. Application Data

(60) Provisional application No. 62/851,557, filed on May 22, 2019.

(51) Int. Cl.
*C07K 7/64*   (2006.01)
*A61K 45/06*   (2006.01)
*A61K 38/00*   (2006.01)

(52) U.S. Cl.
CPC ............... *C07K 7/64* (2013.01); *A61K 45/06* (2013.01); *A61K 38/00* (2013.01)

(58) Field of Classification Search
CPC .............. C07K 7/64; C07K 7/08; A61P 31/04
See application file for complete search history.

(56) References Cited

U.S. PATENT DOCUMENTS

2003/0078207 A1   4/2003 Qiu
2016/0000952 A1   1/2016 Alarcon

OTHER PUBLICATIONS

Allen LV Jr. Dosage form design and development. Clin Ther. Nov. 2008;30(11):2102-11. doi: 10.1016/j.clinthera.2008.11.015. PMID: 19108798. (Year: 2008).*

Harrison et al. Downsizing human, bacterial, and viral proteins to short water-stable alpha helices that maintain biological potency, Proc. Natl. Acad. Sci. U.S.A. 107 (26) 11686-11691,https://doi.org/10.1073/pnas.1002498107 (2010). (Year: 2010).*

Johnsborg et al. A hydrophobic patch in the competence-stimulating Peptide, a pneumococcal competence pheromone, is essential for specificity and biological activity. J Bacteriol. Mar. 2006; 188(5):1744-9. doi: 10.1128/JB.188.5.1744-1749.2006. PMID: 16484185; PMCID: PMC1426553. (Year: 2006).*

Taylor JW. The synthesis and study of side-chain lactam-bridged peptides. Biopolymers. 2002;66(1):49-75. doi: 10.1002/bip.10203. PMID: 12228920. (Year: 2002).*

Pires A, Fortuna A, Alves G, Falcão A. Intranasal drug delivery: how, why and what for? J Pharm Pharm Sci. 2009;12(3):288-311. doi: 10.18433/j3nc79. PMID: 20067706. (Year: 2009).*

Yang et al. Structure—Activity Relationships of the Competence Stimulating Peptides (CSPs) in *Streptococcus* pneumoniae Reveal Motifs Critical for Intra-group and Cross-group ComD Receptor Activation ACS Chemical Biology 2017 12 (4), 1141-1151 DOI: 10.1021/acschembio.7b00007 (Year: 2017).*

Zhou Y, Peng Y. Synergistic effect of clinically used antibiotics and peptide antibiotics against Gram-positive and Gram-negative bacteria. Exp Ther Med. Oct. 2013;6(4):1000-1004. doi: 10.3892/etm.2013.1231. Epub Jul. 23, 2013. PMID: 24137305; PMCID: PMC3797290. (Year: 2013).*

Taylor, John W. "The synthesis and study of side-chain lactam-bridged peptides." Peptide Science: Original Research on Biomolecules 66.1 (2002): 49-75. (Year: 2002).*

Johnsborg, Ola, et al. "A hydrophobic patch in the competence-stimulating peptide, a pneumococcal competence pheromone, is essential for specificity and biological activity." Journal of bacteriology 188.5 (2006): 1744-1749. (Year: 2006).*

Patent Cooperation Treaty: International Search Report and Written Opinion for PCT/US2020/034087 dated Sep. 8, 2020; 12 pages.

Yang, et al., "Structural Characterization of Competence Stimulating Peptide (CSPs) Analogues Reveals Key Features for ComD1 and ComD2 Receptor Binding in *Streptococcus* Pneumoniae", Biochemistry vol. 57, No. 36; Sep. 2018; pp. 5359-5369.

Koirala, et al., "Development of a Dominant Negative Competence Stimulating Peptide (dnCSP) that Attenuates Streptococcus Pneumoniae Infectivity in a Mouse Model of Acute Pneumonia", Chembiochem vol. 19, No. 22; Nov. 2018; pp. 2380-2386.

(Continued)

*Primary Examiner* — Jeanette M Lieb
*Assistant Examiner* — David Paul Bowles
(74) *Attorney, Agent, or Firm* — Schwabe, Williamson & Wyatt PC

(57) ABSTRACT

Disclosed herein are compositions, methods of treatment and kits for treating *Streptococcus Pneumoniae* infections. In some examples, compositions including cyclic dominant negative competence stimulating peptide analogs are disclosed and used for treating *Streptococcus Pneumoniae* infections.

9 Claims, 18 Drawing Sheets
Specification includes a Sequence Listing.

(56) References Cited

OTHER PUBLICATIONS

Zhu, et al., "Inhibition of Competence Development, Horizontal Gene Transfer and Virulence in *Streptococcus* Pheumoniae by a Modified Competence Stimulating Peptide", PLOS Pathogens vol. 7, No. 9; Sep. 2011; 15 pages.

Yang, et al., "Designing cyclic competence-stimulating peptide (CSP) analogs with pan-group quorum-sensing inhibition activity in *Streptococcus* Pneumoniae", PNAS vol. 117, No. 3; Jan. 2020; pp. 1689-1699.

* cited by examiner

AMRLS(Dab)FFREFILQRKK  SEQ ID NO: 7
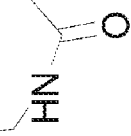
CSP1-E1A-cyc(Dab6E10)
AMRLS(Dap)FFREFILQRKK  SEQ ID NO: 7
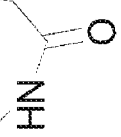
CSP1-E1A-cyc(Dap6E10)
AMRLS(Dap)FFREFILQR  SEQ ID NO: 16

FIG. 4A
FIG. 4B
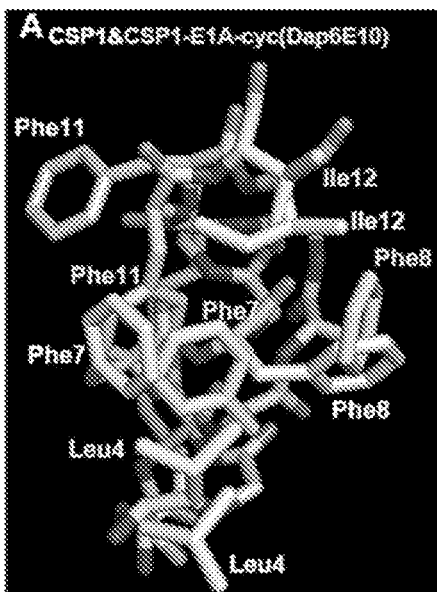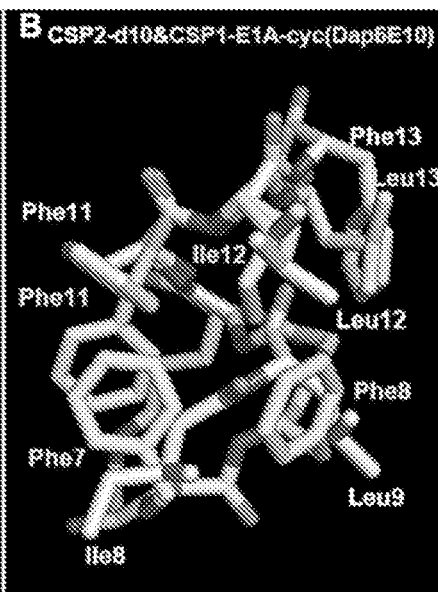
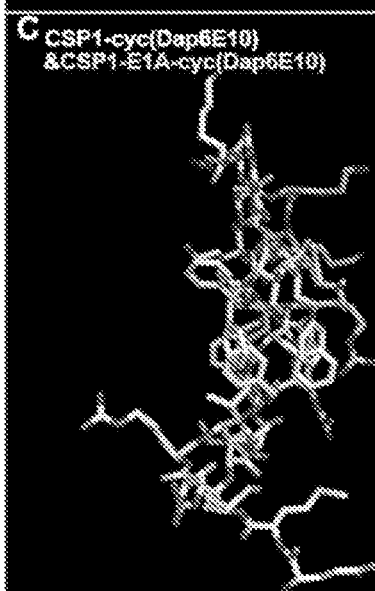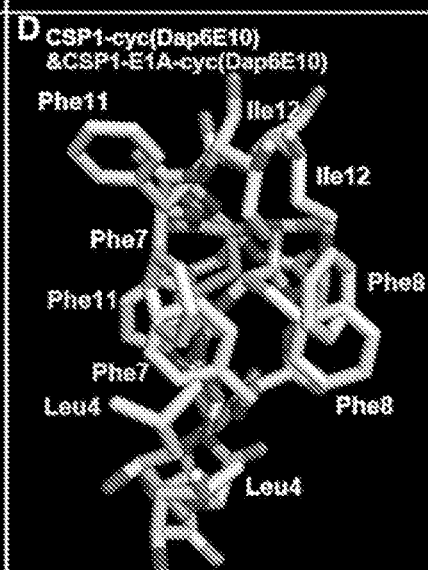
FIG. 4C
FIG. 4D

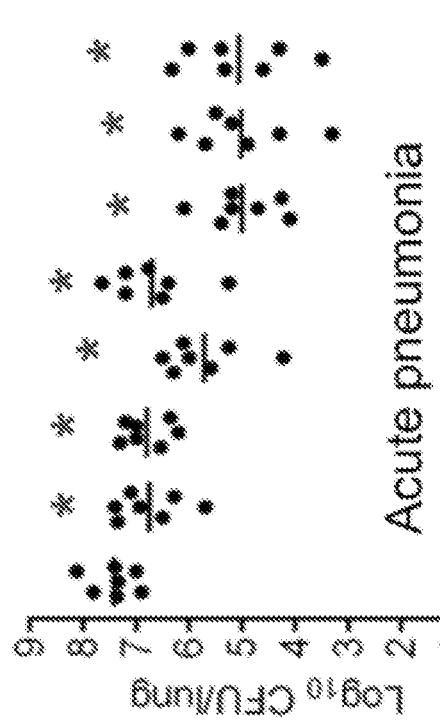

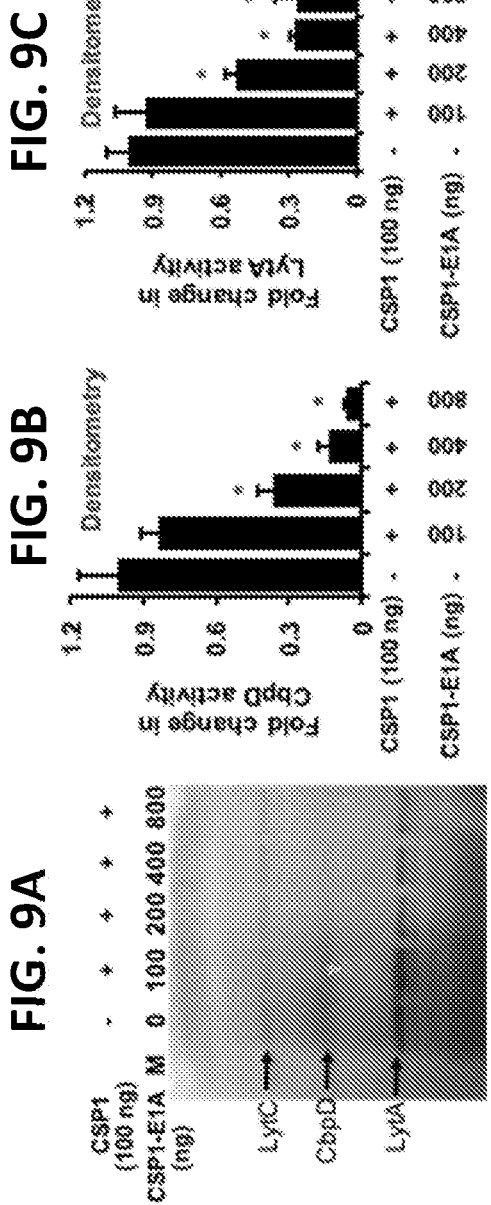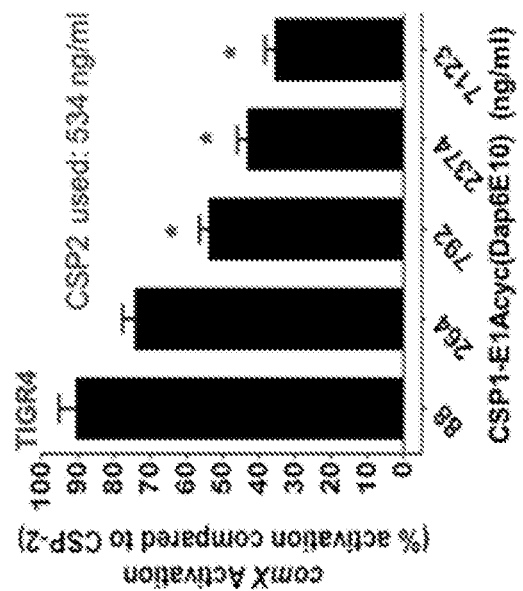

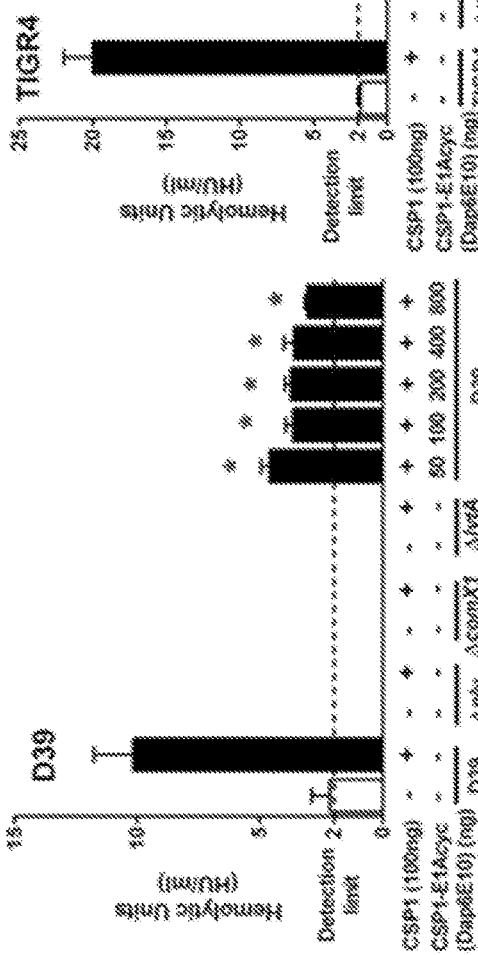
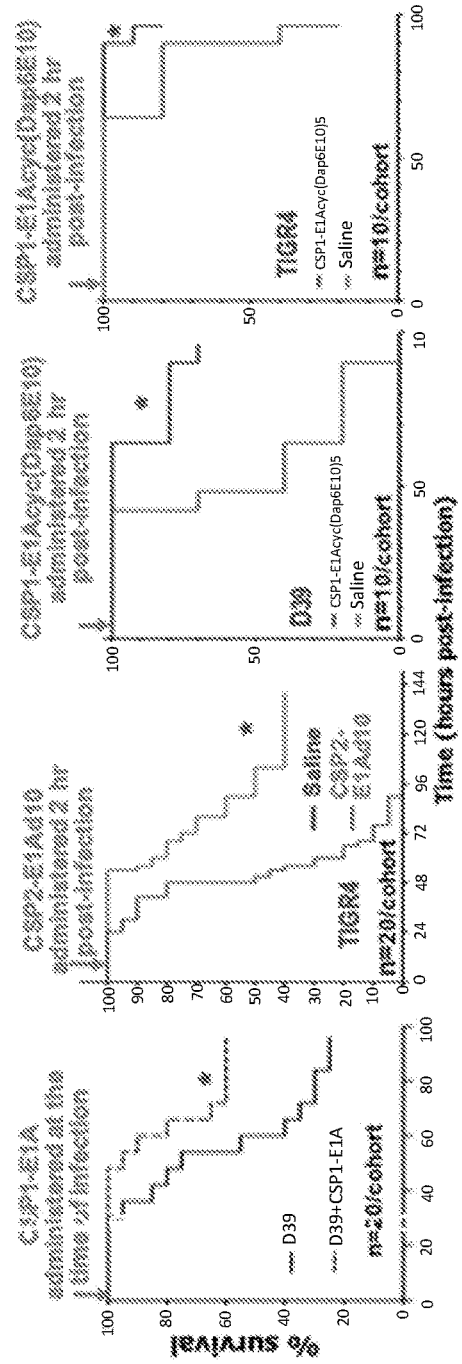
FIG. 10A
FIG. 10B
FIG. 10C

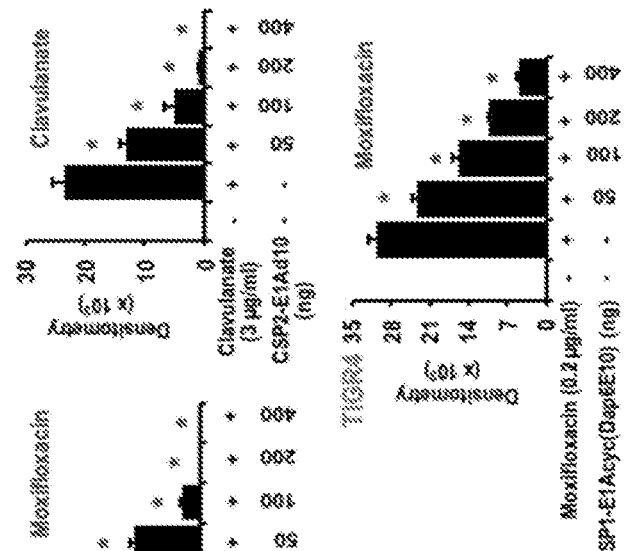
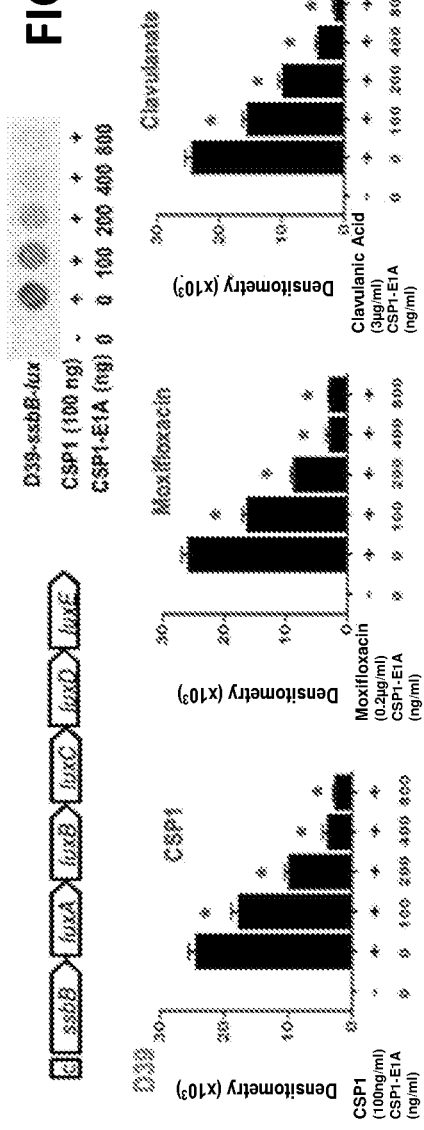
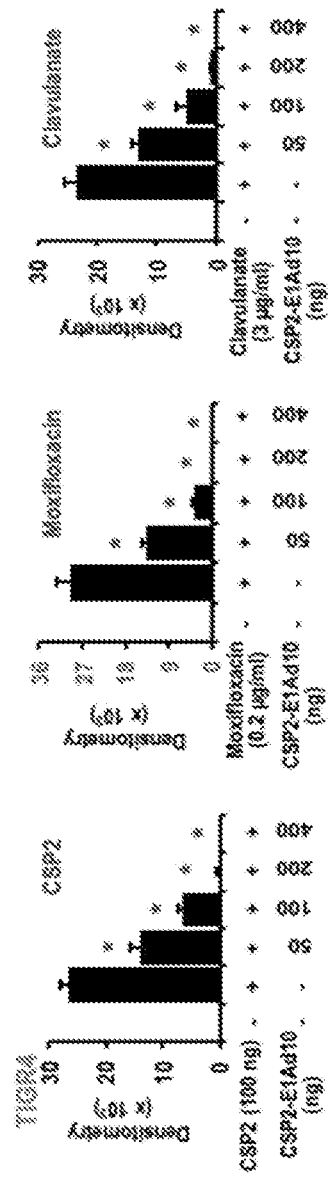
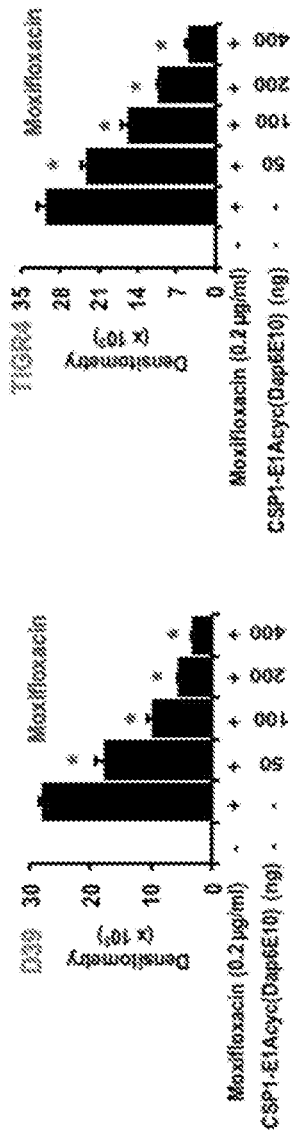
FIG. 11A
FIG. 11B
FIG. 11C
FIG. 11D
FIG. 11E

FIG. 13

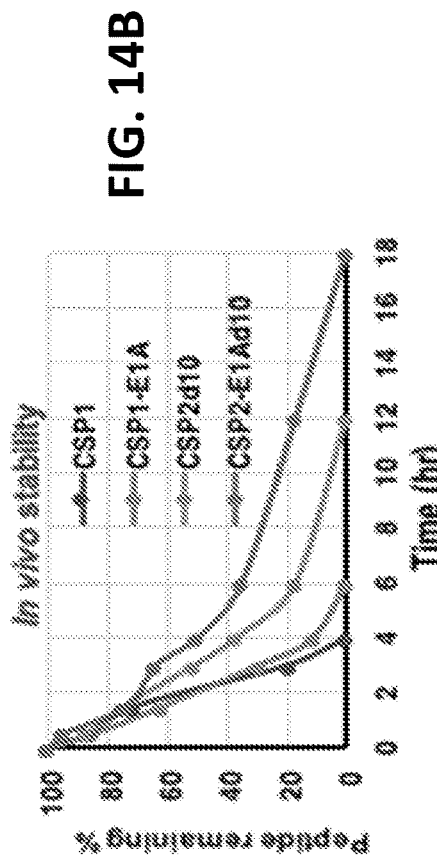
FIG. 14A
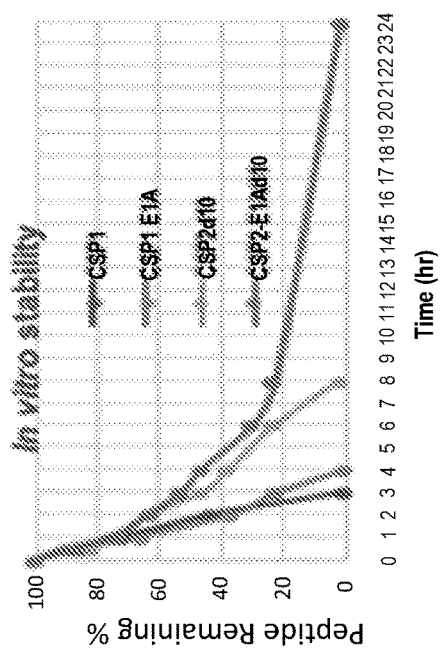
FIG. 14B
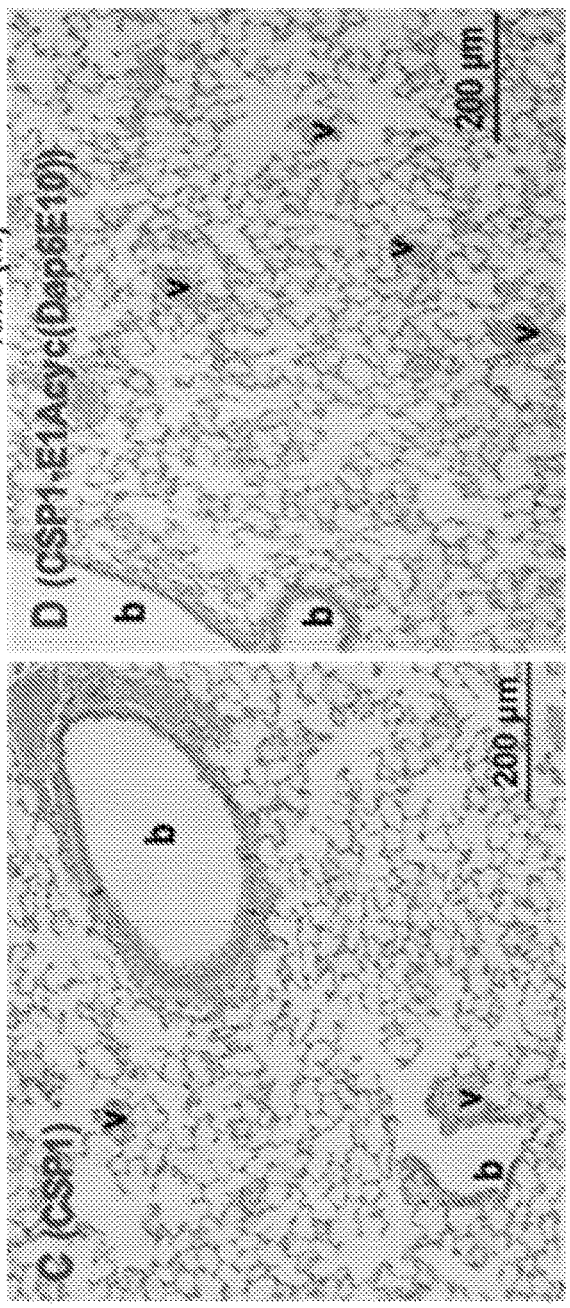
FIG. 14C
FIG. 14D

```
SEQUENCE LISTING

<160> NUMBER OF SEQ ID NOS: 16

<210> SEQ ID NO 1
<211> LENGTH: 17
<212> TYPE: PRT
<213> ORGANISM: Artificial Sequence
<220> FEATURE:
<223> OTHER INFORMATION: synthetic peptide

<400> SEQUENCE: 1

Glu Met Arg Leu Ser Lys Phe Phe Arg Asp Phe Ile Leu Gln Arg Lys
1               5                   10                  15

Lys

<210> SEQ ID NO 2
<211> LENGTH: 17
<212> TYPE: PRT
<213> ORGANISM: Artificial Sequence
<220> FEATURE:
<223> OTHER INFORMATION: synthetic peptide

<400> SEQUENCE: 2

Glu Met Arg Ile Ser Arg Ile Ile Leu Asp Phe Leu Phe Leu Arg Lys
1               5                   10                  15

Lys

<210> SEQ ID NO 3
<211> LENGTH: 17
<212> TYPE: PRT
<213> ORGANISM: Artificial Sequence
<220> FEATURE:
```

<223> OTHER INFORMATION: synthetic peptide

<400> SEQUENCE: 3

Ala Met Arg Leu Ser Lys Phe Phe Arg Asp Phe Ile Leu Gln Arg Lys
1               5                   10                  15

Lys

<210> SEQ ID NO 4
<211> LENGTH: 17
<212> TYPE: PRT
<213> ORGANISM: Artificial Sequence
<220> FEATURE:
<223> OTHER INFORMATION: synthetic peptide

<400> SEQUENCE: 4

Glu Met Arg Leu Ser Ala Phe Phe Arg Asp Phe Ile Leu Gln Arg Lys
1               5                   10                  15

Lys

<210> SEQ ID NO 5
<211> LENGTH: 17
<212> TYPE: PRT
<213> ORGANISM: Artificial Sequence
<220> FEATURE:
<223> OTHER INFORMATION: synthetic peptide

<400> SEQUENCE: 5

Glu Met Arg Ile Ser Arg Ile Ile Leu Asp Phe Leu Phe Leu Arg Lys
1               5                   10                  15

Lys

<210> SEQ ID NO 6
<211> LENGTH: 17
<212> TYPE: PRT
<213> ORGANISM: Artificial Sequence
<220> FEATURE:
<223> OTHER INFORMATION: synthetic peptide

<400> SEQUENCE: 6

Ala Met Arg Ile Ser Arg Ile Ile Leu Asp Phe Leu Phe Leu Arg Lys
1               5                   10                  15

Lys

<210> SEQ ID NO 7
<211> LENGTH: 17
<212> TYPE: PRT
<213> ORGANISM: Artificial Sequence
<220> FEATURE:
<223> OTHER INFORMATION: synthetic peptide
<220> FEATURE:
<221> NAME/KEY: MISC_FEATURE
<222> LOCATION: (6)..(6)
<223> OTHER INFORMATION: X is a non-natural amino acid Dab, Dap or ORN

<400> SEQUENCE: 7

Ala Met Arg Leu Ser Xaa Phe Phe Arg Glu Phe Ile Leu Gln Arg Lys
1               5                   10                  15

Lys

<210> SEQ ID NO 8
<211> LENGTH: 17
<212> TYPE: PRT
<213> ORGANISM: Artificial Sequence
<220> FEATURE:

<223> OTHER INFORMATION: synthetic peptide

<400> SEQUENCE: 8

Glu Met Arg Leu Ser Lys Phe Phe Asp Asp Phe Ile Leu Gln Arg Lys
1               5                   10                  15

Lys

<210> SEQ ID NO 9
<211> LENGTH: 17
<212> TYPE: PRT
<213> ORGANISM: Artificial Sequence
<220> FEATURE:
<223> OTHER INFORMATION: synthetic peptide

<400> SEQUENCE: 9

Glu Met Arg Leu Ser Lys Phe Phe Arg Lys Phe Ile Leu Asp Arg Lys
1               5                   10                  15

Lys

<210> SEQ ID NO 10
<211> LENGTH: 17
<212> TYPE: PRT
<213> ORGANISM: Artificial Sequence
<220> FEATURE:
<223> OTHER INFORMATION: synthetic peptide

<400> SEQUENCE: 10

Glu Met Arg Leu Ser Lys Phe Phe Arg Asp Phe Ile Leu Asp Arg Lys
1               5                   10                  15

Lys

<210> SEQ ID NO 11
<211> LENGTH: 17
<212> TYPE: PRT
<213> ORGANISM: Artificial Sequence
<220> FEATURE:
<223> OTHER INFORMATION: synthetic peptide
<220> FEATURE:
<221> NAME/KEY: MISC_FEATURE
<222> LOCATION: (6)..(6)
<223> OTHER INFORMATION: X is a non-natural amino acid Dab, Dap or ORN

<400> SEQUENCE: 11

Glu Met Arg Leu Ser Xaa Phe Phe Arg Asp Phe Ile Leu Gln Arg Lys
1               5                   10                  15

Lys

<210> SEQ ID NO 12
<211> LENGTH: 17
<212> TYPE: PRT
<213> ORGANISM: Artificial Sequence
<220> FEATURE:
<223> OTHER INFORMATION: synthetic peptide

<400> SEQUENCE: 12

Glu Met Arg Leu Ser Lys Phe Phe Arg Glu Phe Ile Leu Gln Arg Lys
1               5                   10                  15

Lys

<210> SEQ ID NO 13
<211> LENGTH: 17
<212> TYPE: PRT
<213> ORGANISM: Artificial Sequence
<220> FEATURE:

<223> OTHER INFORMATION: synthetic peptide
<220> FEATURE:
<221> NAME/KEY: MISC_FEATURE
<222> LOCATION: (6)..(6)
<223> OTHER INFORMATION: X is a non-natural amino acid Dab, Dap or ORN

<400> SEQUENCE: 13

Glu Met Arg Leu Ser Xaa Phe Phe Arg Glu Phe Ile Leu Gln Arg Lys
1               5                   10                  15

Lys

<210> SEQ ID NO 14
<211> LENGTH: 17
<212> TYPE: PRT
<213> ORGANISM: Artificial Sequence
<220> FEATURE:
<223> OTHER INFORMATION: synthetic peptide
<220> FEATURE:
<221> NAME/KEY: MISC_FEATURE
<222> LOCATION: (1)..(1)
<223> OTHER INFORMATION: X can be an A or E
<220> FEATURE:
<221> NAME/KEY: MISC_FEATURE
<222> LOCATION: (6)..(6)
<223> OTHER INFORMATION: K or A or unnatural amino acid
<220> FEATURE:
<221> NAME/KEY: MISC_FEATURE
<222> LOCATION: (9)..(9)
<223> OTHER INFORMATION: X is a R or D
<220> FEATURE:
<221> NAME/KEY: MISC_FEATURE
<222> LOCATION: (10)..(10)
<223> OTHER INFORMATION: X is E, D or K
<220> FEATURE:
<221> NAME/KEY: MISC_FEATURE
<222> LOCATION: (14)..(14)
<223> OTHER INFORMATION: X  is Q or D.

<400> SEQUENCE: 14

Xaa Met Arg Leu Ser Xaa Phe Phe Xaa Xaa Phe Ile Leu Xaa Arg Lys
1               5                   10                  15

Lys

<210> SEQ ID NO 15
<211> LENGTH: 17
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<223> OTHER INFORMATION: X is an E or A
<220> FEATURE:
<221> NAME/KEY: misc_feature
<222> LOCATION: (1)..(1)
<223> OTHER INFORMATION: X is an E or A

<400> SEQUENCE: 15

Xaa Met Arg Ile Ser Arg Ile Ile Leu Asp Phe Leu Phe Leu Arg Lys
1               5                   10                  15

Lys

<210> SEQ ID NO 16
<211> LENGTH: 15
<212> TYPE: PRT
<213> ORGANISM: Artificial Sequence
<220> FEATURE:
<223> OTHER INFORMATION: synthetic peptide
<220> FEATURE:
<221> NAME/KEY: MISC_FEATURE

```
<222> LOCATION: (6)..(6)
<223> OTHER INFORMATION: X is a non-natural amino acid Dab, Dap or ORN

<400> SEQUENCE: 16

Ala Met Arg Leu Ser Xaa Phe Phe Arg Glu Phe Ile Leu Gln Arg
1               5                   10                  15
```

CYCLIC DOMINANT NEGATIVE COMPETENCE STIMULATING PEPTIDE ANALOGS AND METHODS OF TREATING *STREPTOCOCCUS* PNEUMONIAE INFECTIONS

CROSS REFERENCE TO RELATED APPLICATION

This Application is a US National Stage Application under 35 USC § 371 of PCT/US2020/034087, filed May 21, 2020, which claims the benefit under 35 USC § 119 (e) of U.S. Provisional Patent Application No. 62/851,557, filed on May 22, 2019, each of which is herein incorporated by reference in its entirety.

STATEMENT OF GOVERNMENT SUPPORT

This invention was made with government support under CHE-1808370 awarded by National Science Foundation and R35GM128651 by the National Institutes of Health. The government has certain rights in the invention.

FIELD

This disclosure relates to peptide analogs and in particular, cyclic dominant negative competence stimulating peptide analogs and methods of treatment, including methods of treating *Streptococcus Pneumoniae* infections.

REFERENCE TO A SEQUENCE LISTING

This application incorporates by reference the Sequence Listing submitted in Computer Readable Form as file 129879-254461 Sequence, created on May 18, 2020 and containing 5 kilobytes.

BACKGROUND

*S. pneumoniae* is still considered a major threat to human health. Specifically, it is a major cause of community acquired pneumonia (CAP), pneumonia-derived sepsis (pneumonic sepsis), meningitis and otitis media, resulting in direct medical costs of greater than $3.5 billion a year, in the U.S. There are approximately 175,000 CAP cases a year in the U.S. and 400,000 hospitalizations due to pneumococcal infections. The impressive adaptability of pneumococcus to overcome various treatment and preventive strategies is largely attributed to two factors: (1) its ability to rapidly acquire new genetic material from the environment through activation of the competence regulon, leading to antibiotic resistant strains, and (2) its recombinogenic nature that allows pneumococcus to switch its capsular type, thereby evading vaccine-conferred immunity. Thus, new treatment strategies that emphasize reduction in selective pressure for resistance development are urgently needed.

SUMMARY

Disclosed herein are peptide analogs, compositions and methods for treating bacterial infections, such as *Streptococcus pneumoniae* infections. In particular, this disclosure is focused on treatment of *S. pneumoniae* infections through targeting the competence regulon, a quorum sensing circuitry that regulates virulence in *S. pneumoniae*. To this end, the inventors have designed and developed cyclic peptide scaffolds that mimic the native competence stimulating peptide pheromone, but that act in a dominant negative manner, meaning that they inhibit the quorum sensing circuitry and attenuate *S. pneumoniae* virulence. The results disclosed herein indicate that treatment of *S. pneumoniae* infections with stimulating peptide analogs, such as dominant negative competence stimulating peptide analogs attenuate pneumococcal infections, while at the same time inhibit the ability of the bacteria to acquire antibiotic resistance. The disclosed compositions can be used to treat bacterial infections, antibiotic resistant pneumococcus infections and/or alleviate adverse side-effects of currently used pneumococcal antibiotics. In some examples, the disclosed compositions are used to treat pneumonia, bacteremia, sepsis, meningitis, otitis media, and/or other *S. pneumoniae* caused conditions/diseases.

The foregoing and other features of the disclosure will become more apparent from the following detailed description of several embodiments, which proceeds with reference to the accompanying figures.

BRIEF DESCRIPTION OF THE DRAWINGS

FIGS. 1A and 1B. (FIG. 1A) amino acid sequence of CSP1. (FIG. 1B) Simplified structures of select cyclic CSP1 analogues.

(FIG. 2A) Overlay of proposed hydrophobic patch for effective ComD1 binding (silver) and CSP1-cyc(K6D10) (cyan) structures. (FIG. 2B) Overlay of proposed hydrophobic patch for effective ComD1 binding (silver) and CSP1-cyc(Orn6D10) (cyan) structures. (FIG. 2C) Overlay of proposed hydrophobic patch for effective ComD1 binding (silver) and CSP1-cyc(Dab6E10) (cyan) structures. (FIG. 2D) Overlay of proposed hydrophobic patch for effective ComD1 binding (silver) and CSP1-cyc (Dap6E10) (cyan) structures. Residues E1-R3 and L13-K17, as well as the side chains of S5 and R9 in the cyclic peptide structures are hidden for clarity.

(FIG. 3A) Overlay of proposed hydrophobic patch for effective ComD2 binding (silver) and CSP1-cyc(K6D10) (cyan) structures. FIG. 3B) Overlay of proposed hydrophobic patch for effective ComD2 binding (silver) and CSP1-cyc(Orn6D10) (cyan) structures. (FIG. 3C) Overlay of proposed hydrophobic patch for effective ComD2 binding (silver) and CSP1-cyc(Dab6E10) (cyan) structures. (FIG. 3D) Overlay of proposed hydrophobic patch for effective ComD2 binding (silver) and CSP1-cyc (Dap6E10) (cyan) structures. Residues E1-S5 and Q14-K17, as well as the side chains of S5 and R9 in the cyclic peptide structures are hidden for clarity.

FIGS. 4A-4D. (FIG. 4A) Overlay of CSP1 (silver) and CSP1-E1A-cyc(Dap6E10) (cyan) structures. (FIG. 4B) Overlay of CSP2-d10 (silver) and CSP1-E1A-cyc (Dap6E10) (cyan) structures. (FIG. 4C) Overlay of CSP1-cyc(Dap6E10) (silver) and CSP1-E1A-cyc(Dap6E10) (cyan; BMRB accession ID: 30690) structures. (FIG. 4D) Overlay of CSP1-cyc(Dap6E10) (silver) and CSP1-E1A-cyc (Dap6E10) (cyan) structures emphasizing the hydrophobic patch regions. In (FIG. 4A), (4B) and (4D), residues E1-R3 and L13-K17 (E1-S5 and Q14-K17 in panel B) of the cyclic peptide, residues E1-R3 and L13-K17 of CSP1, residues E1-17 and L14-K17 of CSP2-d10, the side chain of R9 (S5 and R9 in panel A and D) in the cyclic peptide structures, the side chains of S5, K6, R9, D10 in the CSP1 structure, and the side chain of D10 in the CSP2-d10 structure are hidden for clarity.

(FIGS. 5A-5B) CD1 mice (n=5) were challenged with 1:1 mixture of D39 vs. mutants in acute pneumonia (intranasal, $5\times10^6$ CFU, 48 hours) or bacteremia (intraperitoneal, $1\times10^4$ CFU, 24 hours). Bacterial burden in lungs and spleens were used to determine the competitive indexes (CI). CI is defined as the input ratio of mutant and wild-type divided by output ratio of mutant and wild-type. (FIGS. 5C-5D) CD1 mice (n=7-10) were challenged with D39 or ΔcomX1ΔcomX2 in single pneumonia ($5\times10^6$ CFU) or bacteremia ($1\times10^4$ CFU) infection. Spleen and lungs were harvested for bacterial burden. * $p<0.05$ when comparing the CI and bacterial burden of D39 vs. ΔcomX1ΔcomX2 by the GRAPHPAD Prism graphing software.

FIGS. 6A-6B. Competence-regulated allolytic factors are important for virulence. CD1 mice (n=6-7) were infected intranasally (FIG. 6A) or intraperitoneally (FIG. 6B) with wild-type D39 vs. allolytic-deficient mutants (see FIGS. 5A-5D). Bacteria in the lungs and spleen were enumerated. * $p<0.05$ comparing D39 vs. mutants by using the GRAPHPAD Prism graphing software.

(FIGS. 7C-7D) Group 1 strain D39 and group 2 strain TIGR4 and their respective derivatives were treated with 50 nM of CSP1 or CSP2 in the presence or absence of increasing concentrations of CSP1-E1A-cyc(Dap6E10). The release of pneumolysin into culture supernatant as manifested by the hemolytic activity was quantified. All experiments were performed in triplicate. Data are shown as the mean±s.e.m. * $p<0.05$,  $p<0.01$, * $p<0.001$ or *** $p<0.0001$ against D39 exposed to CSP1 or TIGR4 exposed to CSP2 as determined by two-way ANOVA with Tukey's multiple comparisons tests.

FIGS. 9A-9E. dnCSPs competitively inhibit the induction of ComX and allolytic factors by CSP1 and CSP2. (FIGS. 9A-9C) CSP1-E1A inhibits the expression of ComX-regulated LytA and CbpD by CSP1. D39 cells were treated simultaneously with indicated concentrations of CSP1 vs. CSP1-E1A, incubated for 30 minutes, lysed and subjected to zymogram analysis. Lytic activity was quantified by densitometry. (FIGS. 9D-9E) The pan-cyclic dnCSP CSP1-E1Acyc (Dap6E10) inhibits the induction of ComX by both CSP1 and CSP2. * $p<0.05$ when compared to CSP1-E1A treated samples using the GRAPHPAD Prism graphing software.

FIGS. 10A-10C. dnCSPs competitively inhibit PLY-mediated hemolysis and attenuate mouse mortality during acute pneumonia. (FIGS. 10A-10B) CSP1-E1Acyc (Dap6E10) competitively inhibited hemolysis mediated by supernatant-containing PLY after competence induction by CSP1 in D39 and CSP2 in TIGR4, respectively. * $p<0.01$ against D39 and TIGR4 exposed to native CSPs. (FIG. 10C) dnCSPs reduced mouse mortality during acute pneumonia (n=20). * $p<0.01$ against untreated mice by using the log-rank (Mantel-Cox) test in GRAPHPAD Prism graphing software.

FIGS. 11A-11E. dnCSPs inhibit the induction of ComX transcriptional activities by moxifloxacin and clavulanate. D39-ssbB-lux and TIGR4-ssbB-lux cells were exposed to CSP1, or CSP2, or to moxifloxacin or clavulanate for 50 min in the C+Y medium. (FIG. 11A) The ssbB-luxABCDE fusion. "c" in the promoter represents "combox" where ComX binds and activates transcription. (FIGS. 11B-11D) CSP1-E1A and CSP2-E1Ad10 inhibit CSP, moxifloxacin and clavulanate-mediated induction of ssbB in D39-ssbB-lux and TIGR4-SSbB-lux, respectively. (FIG. 11E) CSP1-E1Acyc (Dap6E10) inhibits the induction of ssbB in both D39-ssbB-lux and TIGR4-SSbB-lux by moxifloxacin. Luminescence signal was detected by exposing 200 μl culture for 3 min in imaging softwarethe FLUORCHEM R Imaging System, and quantified by ImageJ. D39 image (FIG. 11B) is shown. Experiments were performed three times in triplicates with similar results. Densitometry represents mean+std. dev. from three experiments.

(FIG. 12A) Hydrophilic phase highlighting the dispensable Lys6, Arg9, Asp10 and Gln14 residues. (FIG. 12B) Hydrophobic phase highlighting the essential Arg3, Leu4, Phe7, Phe8, Phe11 and Ile12 residues. Methods: NMR spectra (COSY, TOCSY, NOESY, HC-HSQC, and HN-HSQC) were acquired on a 900 MHz spectrometer with a final peptide concentration of 1.5 mM in membrane mimicking conditions: 250 mM deuterated dodecylphosphocholine (DPC-d38) in PBS buffer. Peak assignments for distance and angle restraints were performed in SPARKY and the structures were calculated using Xplor-NIH.

FIG. 13. Exemplary dnCSP scaffolds. These scaffolds are based on lead dnCSPs and studies of the CSP1 and CSP2 scaffolds.

FIGS. 14A-14D. Pharmacological properties of dnCSPs. (FIG. 14A) CSPs were treated with trypsin/chymotrypsin and their degradation monitored by HPLC. (FIG. 14B) CD1 mice (3/cohort, males & females) were intratracheally instilled 400 μg of native or dnCSPs. Mice were bronchial alveolar lavaged (BAL) at indicated times, and cell free BAL fluid (BALF) were analyzed by HPLC. Both CSP1 (blue) and CSP1-E1A (red) had a relatively short half-life (1.5 hours). In contrast, CSP2-d10 (green) and CSP2-E1Ad10 (purple) had significantly longer half-lives (2.5 and >3 hours, respectively). (FIGS. 14C-14D) CD1 mice (5/cohorts, males & females) were intratracheally inoculated with MTD doses of native and dnCSPs (200 μg-20 mg/kg). CBC with differential and histological analysis of major organs did not show toxicity. Lung sections (FIGS. 14C-14D) and other organs were H&E stained. b=bronchioles; v=vessels.

DETAILED DESCRIPTION OF SEVERAL EMBODIMENTS

Figure 1A:
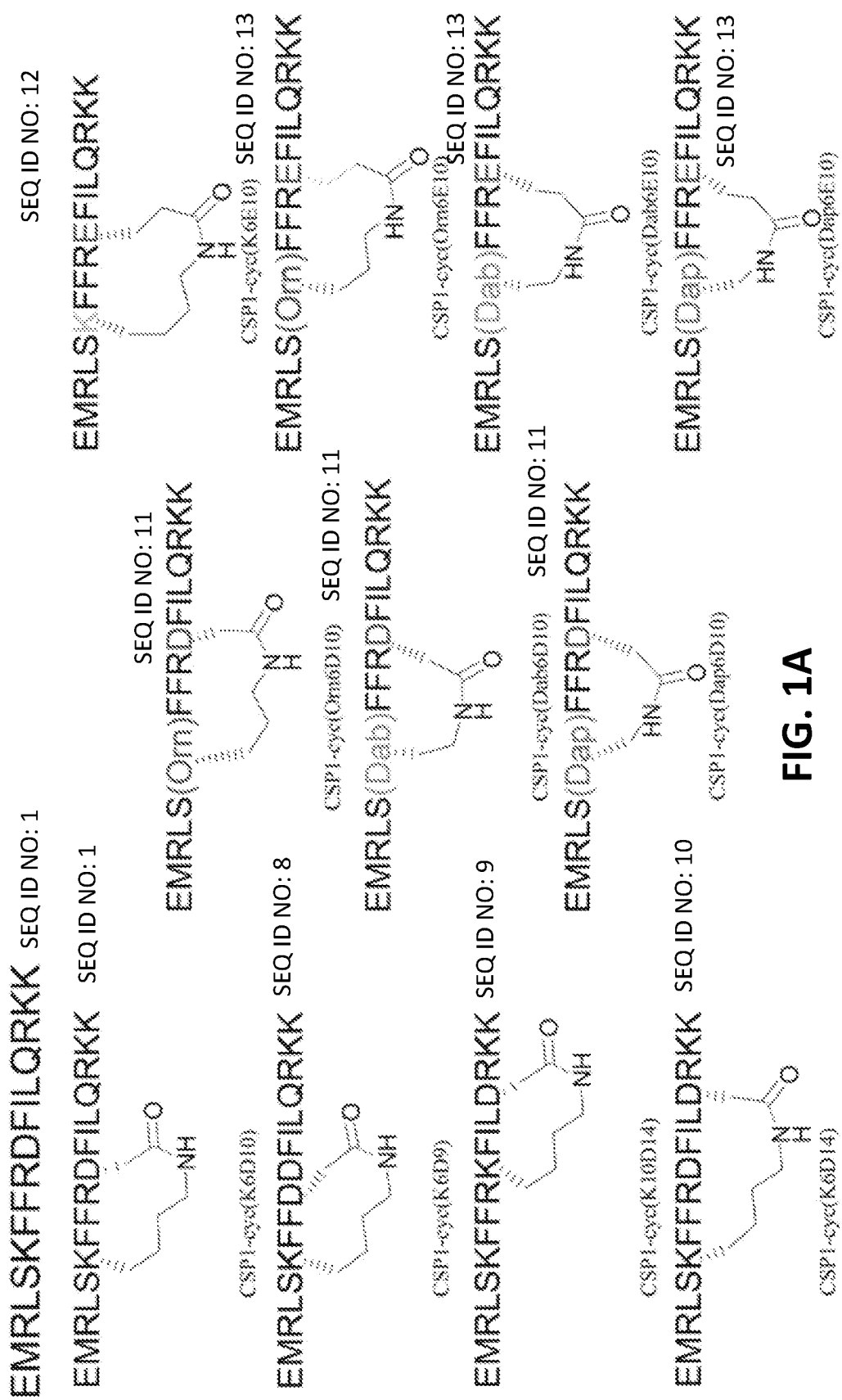
Figures 2A, 2B, 2C, 2D:
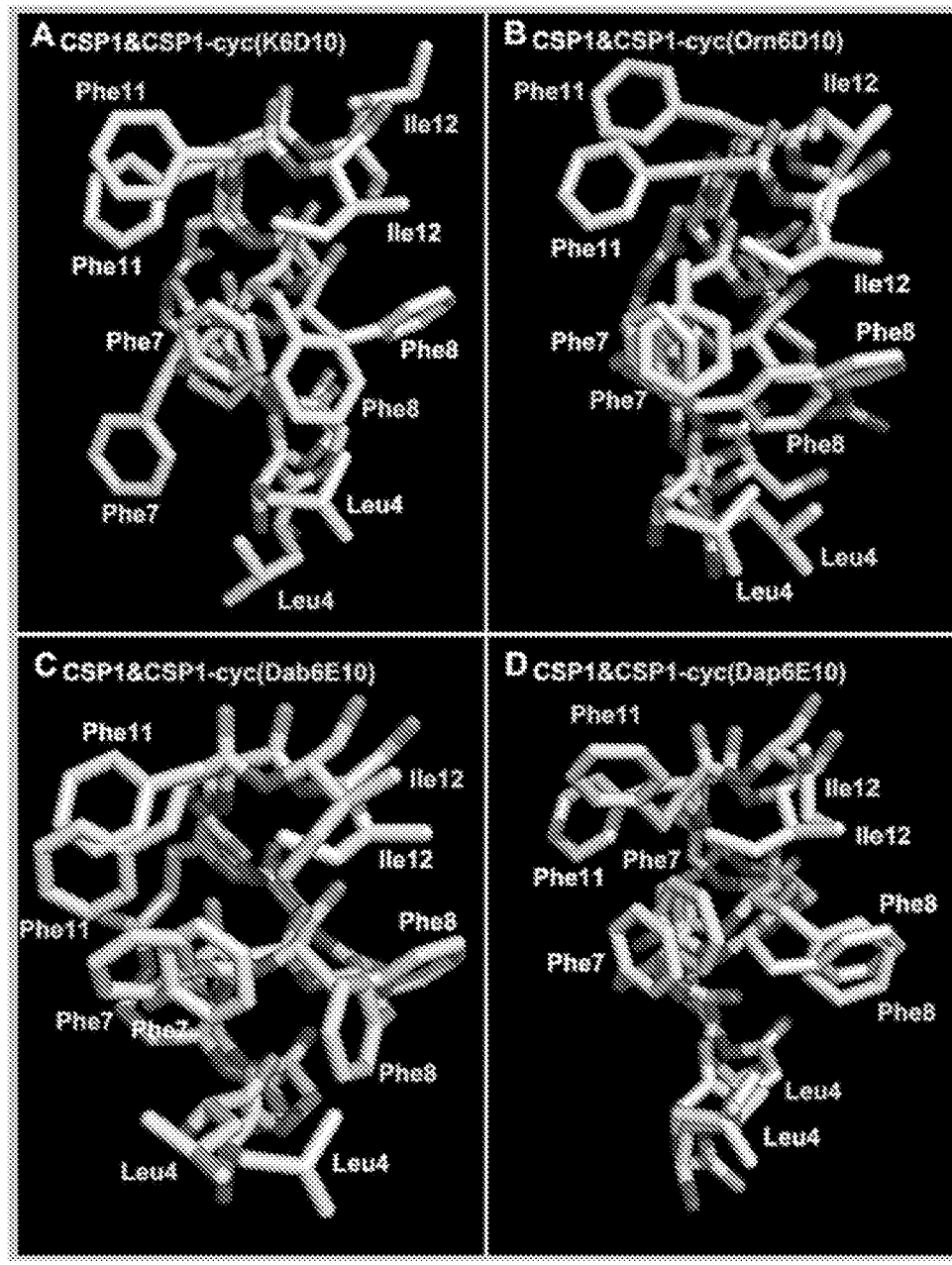
FIGS. 2A-2D.
Figures 3A, 3B, 3C, 3D:
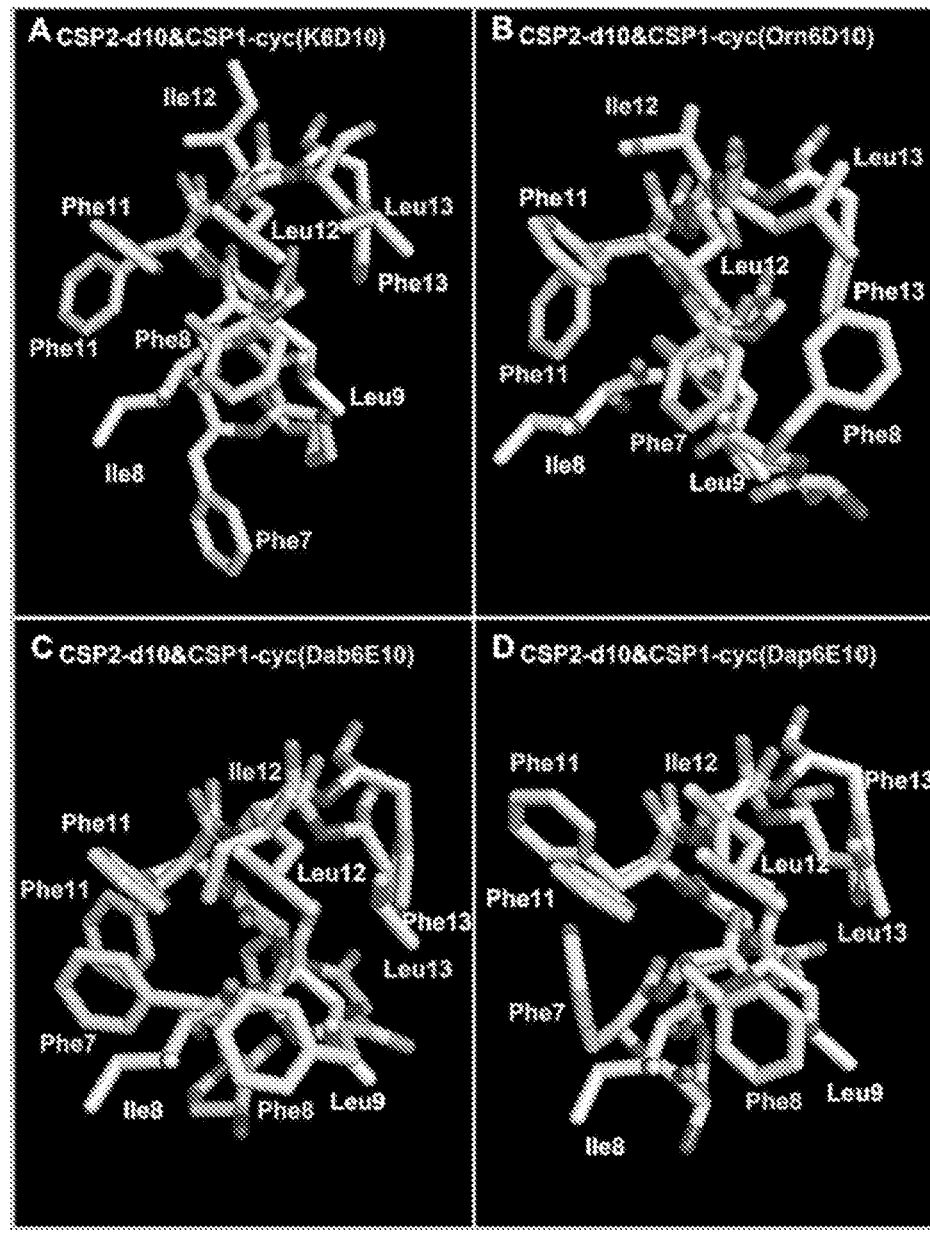
FIGS. 3A-3D.
Figure 4E:
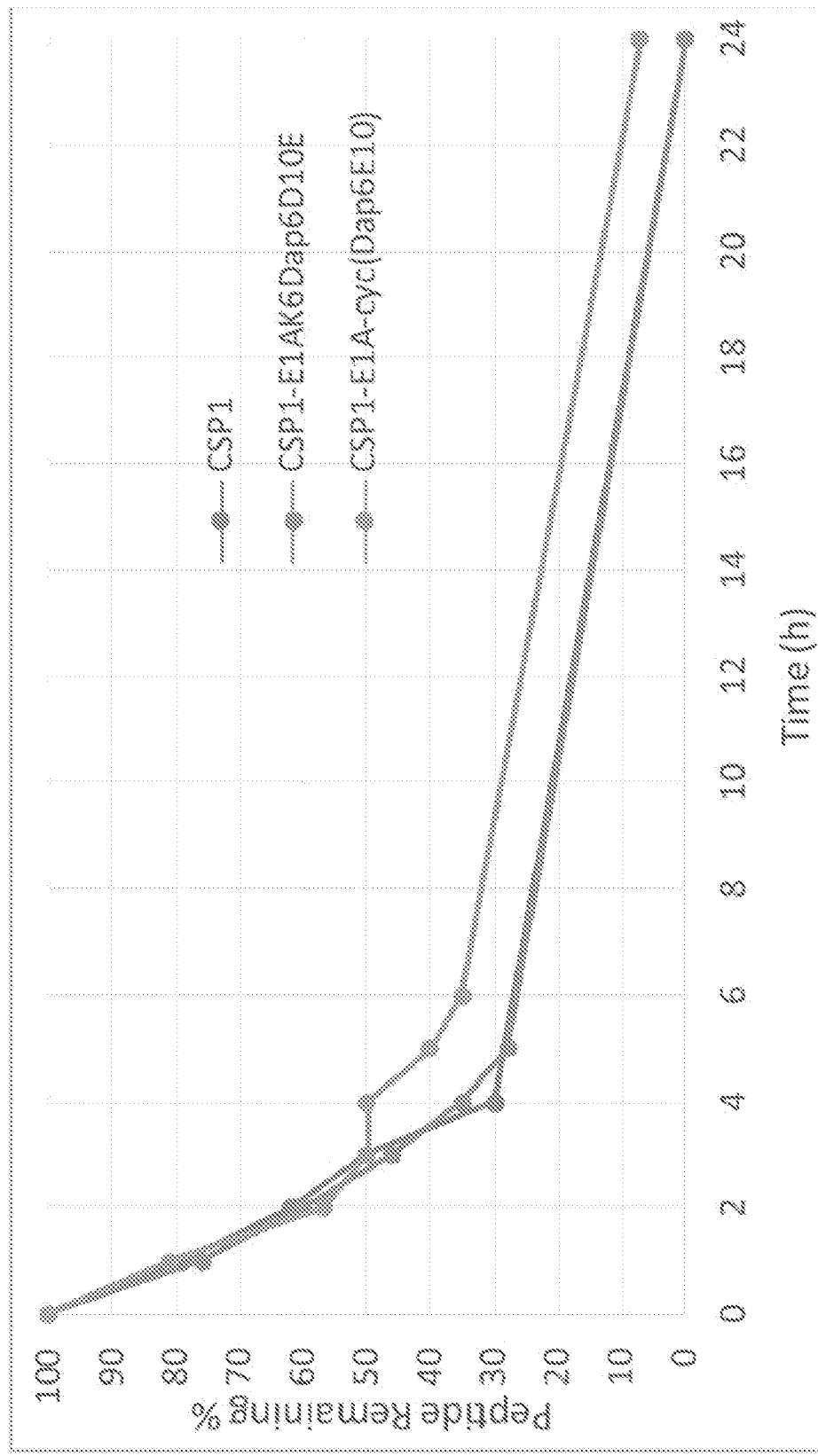
FIG. 4E. Metabolic stability of CSP1 analogues. All peptides were treated with trypsin/chymotrypsin (0.05 μg mL-1 enzyme concentration). RP-HPLC was used to monitor the progress of degradation. All peptides have a half-life about 3 hours. After 3 to 4 hours, some degradation product of CSP1-cyc-E1A(Dap6E10) start to precipitate out, resulting in the plateau in the curve.
Figure 5A:
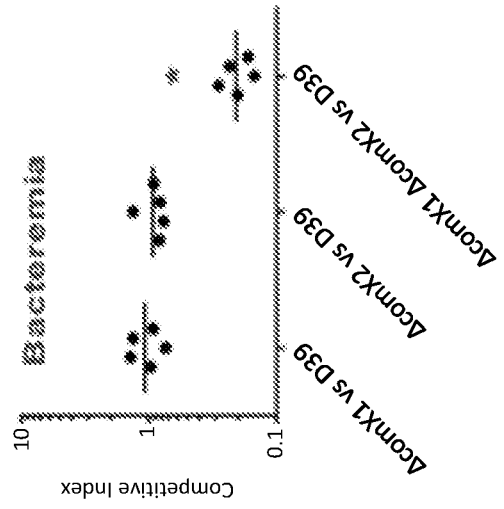
FIGS. 5A-5D. ComX is important for acute pneumonia and bacteremia infections.
Figure 5B:
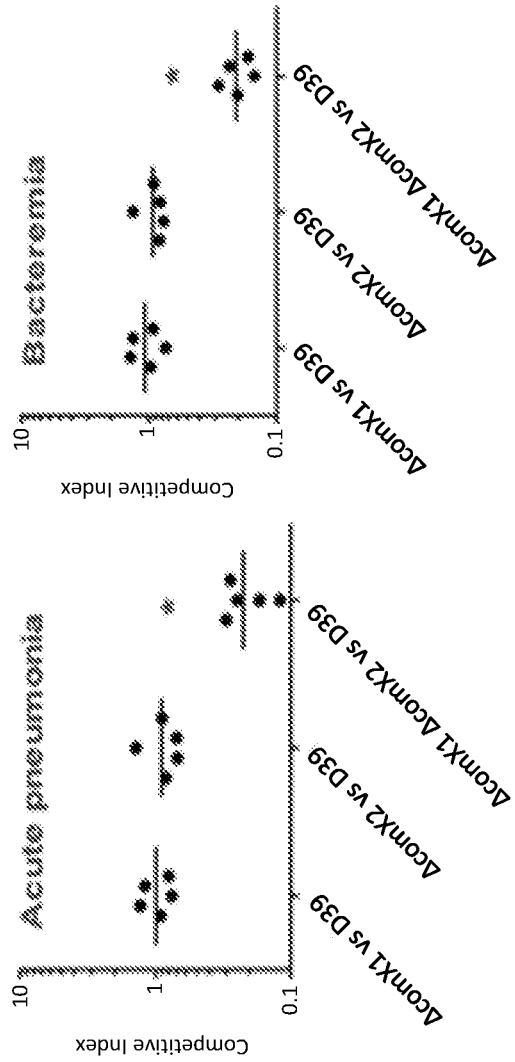
Figure 5C:
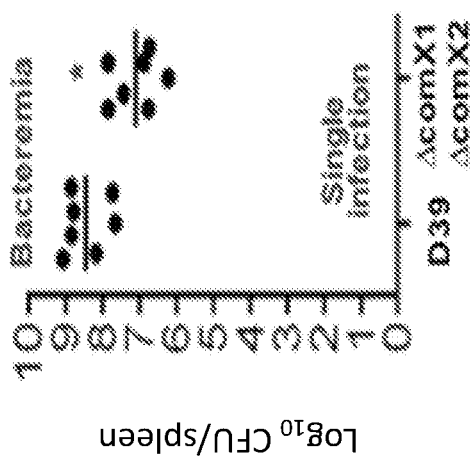
Figure 5D:
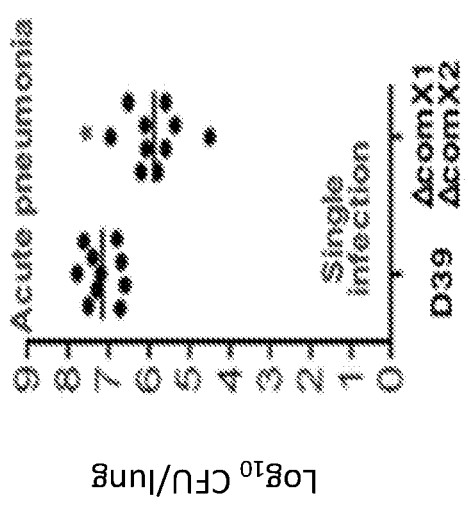

This technology disclosed herein is described in one or more exemplary embodiments in the following description with reference to the Figures. Reference throughout this specification to "one embodiment," "an embodiment," or similar language means that a particular feature, structure, or characteristic described in connection with the embodiment is included in at least one embodiment of the present technology disclosed herein. Thus, appearances of the phrases "in one embodiment," "in an embodiment," and similar language throughout this specification may, but do not necessarily, all refer to the same embodiment.

The described features, structures, or characteristics of the technology disclosed herein may be combined in any suitable manner in one or more embodiments. In the following description, numerous specific details are recited to provide a thorough understanding of embodiments of the technology disclosed herein. One skilled in the relevant art will recognize, however, that the technology disclosed herein may be practiced without one or more of the specific details, or with other methods, components, materials, and so forth. In other instances, well-known structures, materials, or operations are not shown or described in detail to avoid obscuring aspects of the technology disclosed herein.

The following explanations of terms and methods are provided to better describe the present compounds, compositions and methods, and to guide those of ordinary skill in the art in the practice of the present disclosure. It is also to be understood that the terminology used in the disclosure is for the purpose of describing particular embodiments and examples only and is not intended to be limiting.

As used herein, the singular forms "a," "an," and "the" are intended to include the plural forms as well, unless the context clearly indicates otherwise.

As used herein, the term "and/or" refers to and encompasses any and all possible combinations of one or more of the associated listed items, as well as the lack of combinations when interpreted in the alternative ("or").

As used herein, "one or more" or at least one can mean one, two, three, four, five, six, seven, eight, nine, ten or more, up to any number.

As used herein, the term "comprises" means "includes." Hence "comprising A or B" means including A, B, or A and B. It is further to be understood that all base sizes and all molecular weight or molecular mass values given for peptides and nucleic acids are approximate and are provided for description.

As used herein "administration" refers to the introduction of a composition into a subject by a chosen route. For example, if the chosen route is intravenous, the composition is administered by introducing the composition into a vein of the subject. Similarly, if the route of administration is intranasal, the composition is administered through the nose.

An "adjunctive therapy" refers to a treatment used in combination with a primary treatment to improve the effects of the primary treatment.

An "effective amount" or "therapeutically effective amount" refers to an amount of a compound or composition of this invention that is sufficient to produce a desired effect, which can be a therapeutic and/or beneficial effect. The effective amount will vary with the age, general condition of the subject, the severity of the condition being treated, the particular agent administered, the duration of the treatment, the nature of any concurrent treatment, the pharmaceutically acceptable carrier used, and like factors within the knowledge and expertise of those skilled in the art. In some examples, an "effective amount" is one that treats one or more symptoms and/or underlying causes of any of a disorder or disease.

The symptoms and/or underlying cause of a disease, syndrome, infection, etc., do not need to be completely inhibited for the pharmaceutical preparation to be effective. For example, a pharmaceutical preparation may decrease the progression of the disease, syndrome, infection, etc., by a desired amount, for example by at least 10%, at least 20%, at least 50%, at least 60%, at least 70%, at least 80%, at least 90%, at least 95%, at least 98%, or even at least 100%, as compared to the progression typical in the absence of the pharmaceutical preparation.

In another or additional example, it is an amount sufficient to partially or completely alleviate symptoms of the disease within the subject. Treatment can involve only slowing the progression of the disease temporarily, but can also include halting or reversing the progression of the disease permanently.

Effective amounts of the agents described herein can be determined in many different ways, such as, for example, assaying for a reduction in of one or more signs or symptoms associated with an event in the subject or measuring the expression level of one or more molecules known to be associated with a particular condition or disease. Effective amounts also can be determined through various in vitro, in vivo or in situ assays, including the assays described herein or known to those of ordinary skill in the art by reference to the pertinent texts and literature and/or by using routine experimentation. (See, for example, Remington, The Science and Practice of Pharmacy (latest edition)).

The disclosed therapeutic agents can be administered in a single dose, or in several doses, for example hourly, daily, weekly, monthly, yearly, during a course of treatment. The effective amount can be dependent on the subject being treated, the severity and type of the condition being treated, and the manner of administration.

As used herein, the term "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, rodents (e.g., mice, rats, etc.) and the like. Preferably, the subject is a human patient. In particular embodiments, the subject of this disclosure is a human subject. A "subject in need thereof" or "a subject in need of" is a subject known to have, or is suspected of having a surface wound, such as a wound in the skin and surrounding tissue.

As used herein, the terms "treat," "treating" or "treatment" refer to any type of action that imparts a modulating effect, which, for example, can be a beneficial and/or therapeutic effect, to a subject afflicted with a condition, disorder, disease or illness, including, for example, improvement in the condition of the subject (e.g., in one or more symptoms), delay in the progression of the disorder, disease or illness, delay of the onset of the disease, disorder, or illness, and/or change in clinical parameters of the condition, disorder, disease or illness, etc., as would be well known in the art.

As used herein, "signs or symptoms" refer to any subjective evidence of disease or of a subject's condition, e.g., such evidence as perceived by the subject; a noticeable change in a subject's condition indicative of some bodily or mental state. A "sign" is any abnormality indicative of disease, discoverable on examination or assessment of a subject. A sign is generally an objective indication of disease. Signs include, but are not limited to any measurable parameters such as tests for detecting a particular condition.

In one example, reducing or inhibiting one or more symptoms or signs associated with a particular condition or disease includes increasing the activity or expression of a disclosed molecule by a desired amount, for example by at least 10%, at least 20%, at least 50%, at least 60%, at least 70%, at least 80%, at least 90%, at least 95%, at least 98%, or even at least 100%, as compared to the activity and/or expression in the absence of the treatment.

A "peptide", "polypeptide", and/or protein refer to any compound composed of amino acids, amino acid analogs, chemically bound together. Amino acids generally are chemically bound together via amide linkages (CONH). Additionally, amino acids may be bound together by other chemical bonds. For example, the amino acids may be bound by amine linkages. Peptides include oligomers of amino acids, amino acid analog, or small and large peptides, including polypeptides or proteins.

When the amino acids are alpha-amino acids, either the L-optical isomer or the D-optical isomer can be used, the L-isomers being preferred in nature. The term polypeptide is specifically intended to cover naturally occurring proteins, as well as those that are recombinantly or synthetically produced.

Substantially purified polypeptide as used herein refers to a polypeptide that is substantially free of other proteins, lipids, carbohydrates or other materials with which it is naturally associated. In one embodiment, the polypeptide is at least 50%, for example at least 80% free of other proteins, lipids, carbohydrates or other materials with which it is naturally associated. In another embodiment, the polypeptide is at least 90% free of other proteins, lipids, carbohydrates or other materials with which it is naturally associated. In yet another embodiment, the polypeptide is at least 95% free of other proteins, lipids, carbohydrates or other materials with which it is naturally associated.

As applied to polypeptides, the term "substantial similarity" or "substantially similar" means that two peptide sequences, when optimally aligned, such as by the programs GAP or BESTFIT using default gap weights, share at least 95% sequence identity, even more preferably at least 98% or 99% sequence identity. Preferably, residue positions which are not identical differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of similarity may be adjusted upwards to correct for the conservative nature of the substitution. Means for making this adjustment are well-known to those of skill in the art. See, e.g., Pearson (1994) Methods Mol. Biol. 24: 307-331, herein incorporated by reference. Examples of groups of amino acids that have side chains with similar chemical properties include (1) aliphatic side chains: glycine, alanine, valine, leucine and isoleucine; (2) aliphatic-hydroxyl side chains: serine and threonine; (3) amide-containing side chains: asparagine and glutamine; (4) aromatic side chains: phenylalanine, tyrosine, and tryptophan; (5) basic side chains: lysine, arginine, and histidine; (6) acidic side chains: aspartate and glutamate, and (7) sulfur-containing side chains are cysteine and methionine. Preferred conservative amino acids substitution groups are: valine-leucine-isoleucine, phenylalanine-tyrosine, lysine-arginine, alanine-valine, glutamate-aspartate, and asparagine-glutamine. Alternatively, a conservative replacement is any change having a positive value in the PAM250 log-likelihood matrix disclosed in Gonnet et al. (1992) Science 256: 1443-1445, herein incorporated by reference. A "moderately conservative" replacement is any change having a nonnegative value in the PAM250 log-likelihood matrix.

Sequence similarity for polypeptides, which is also referred to as sequence identity, is typically measured using sequence analysis software. Protein analysis software matches similar sequences using measures of similarity assigned to various substitutions, deletions and other modifications, including conservative amino acid substitutions. For instance, GCG software contains programs such as Gap and Bestfit which can be used with default parameters to determine sequence homology or sequence identity between closely related polypeptides, such as homologous polypeptides from different species of organisms or between a wild type protein and a mutein thereof. See, e.g., GCG Version 6.1. Polypeptide sequences also can be compared using FASTA using default or recommended parameters, a program in GCG Version 6.1. FASTA (e.g., FASTA2 and FASTA3) provides alignments and percent sequence identity of the regions of the best overlap between the query and search sequences (Pearson (2000) supra). Another preferred algorithm when comparing a sequence of the invention to a database containing a large number of sequences from different organisms is the computer program BLAST, especially BLASTP or TBLASTN, using default parameters. See, e.g., Altschul et al. (1990) J. Mol. Biol. 215:403-410 and Altschul et al. (1997) Nucleic Acids Res. 25:3389-402, each herein incorporated by reference.

As used herein, "Acyl" is a group of the formula RC(O)— wherein R is an organic group.

As used herein, "Acyloxy" is a group having the structure —OC(O)R, where R may be an optionally substituted alkyl or optionally substituted aryl. "Lower acyloxy" groups are those where R contains from 1 to 10 (such as from 1 to 6) carbon atoms.

As used herein, "Alkoxy" is a radical (or substituent) having the structure —O—R, where R is a substituted or unsubstituted alkyl. Methoxy (—OCH$_3$) is an exemplary alkoxy group. In a substituted alkoxy, R is alkyl substituted with a non-interfering substituent. "Thioalkoxy" refers to —S—R, where R is substituted or unsubstituted alkyl. "Haloalkyloxy" means a radical —OR where R is a haloalkyl.

As used herein, "Alkoxy carbonyl" is a group of the formula —C(O)OR, where R may be an optionally substituted alkyl or optionally substituted aryl. "Lower alkoxy carbonyl" groups are those where R contains from 1 to 10 (such as from 1 to 6) carbon atoms.

As used herein, "Alkyl" is an acyclic, saturated, branched- or straight-chain hydrocarbon radical, which, unless expressly stated otherwise, contains from one to fifteen carbon atoms; for example, from one to ten, from one to six, or from one to four carbon atoms. This term includes, for example, groups such as methyl, ethyl, n-propyl, isopropyl, isobutyl, t-butyl, pentyl, heptyl, octyl, nonyl, decyl, or dodecyl. The term "lower alkyl" refers to an alkyl group containing from one to ten carbon atoms. Unless expressly referred to as an "unsubstituted alkyl," alkyl groups can either be unsubstituted or substituted. An alkyl group can be substituted with one or more substituents (for example, up to two substituents for each methylene carbon in an alkyl chain). Exemplary alkyl substituents include, for instance, amino groups, amide, sulfonamide, halogen, cyano, carboxy, hydroxy, mercapto, trifluoromethyl, alkyl, alkoxy (such as methoxy), alkylthio, thioalkoxy, arylalkyl, heteroaryl, alkylamino, dialkylamino, alkylsulfano, keto, or other functionality.

As used herein, "Amino carbonyl (carbamoyl)" is a group of the formula —OCN(R)R'—, wherein R and R' are independently of each other hydrogen or a lower alkyl group.

As used herein, "Analog or Derivative" refers to a compound which is sufficiently homologous to a compound such that it has a similar functional activity for a desired purpose as the original compound. Analog or derivative refers to a form of a substance, which has at least one functional group altered, added, or removed, compared with a parent compound. "Functional group" refers to a radical, other than a hydrocarbon radical, that adds a physical or chemical property to a substance.

As used herein, "Carbamate" is a group of the formula —OC(O)N(R)—, wherein R is H, or an aliphatic group, such as a lower alkyl group or an aralkyl group.

As used herein, "Optional" or "optionally" means that the subsequently described event or circumstance can but need not occur, and that the description includes instances where said event or circumstance occurs and instances where it does not.

As used herein, "Phenyl" or "Phenyl groups" may be unsubstituted or substituted with one, two or three substituents, with substituent(s) independently selected from alkyl, heteroalkyl, aliphatic, heteroaliphatic, thioalkoxy, halo, haloalkyl (such as CF3), nitro, cyano, OR (where R is hydrogen or alkyl), N(R)R' (where R and R' are independently of each other hydrogen or alkyl), COOR (where R is hydrogen or alkyl) or —C(O)N(R')R" (where R' and R" are independently selected from hydrogen or alkyl).

As used herein, "EC50" is a concentration of a drug that gives a half-maximal response.

The "pharmaceutically acceptable carriers (vehicles)" useful in this disclosure are conventional. Remington's Pharmaceutical Sciences, by E. W. Martin, Mack Publishing Co., Easton, PA, 19th Edition (1995), describes compositions and formulations suitable for pharmaceutical delivery of one or more therapeutic compounds or molecules, such as one or more nucleic acid molecules, proteins or antibodies that bind these proteins, and additional pharmaceutical agents.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions (for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

As used herein "*Streptococcus pneumoniae*, or pneumococcus," is a Gram-positive, alpha-hemolytic (under aerobic conditions) or beta-hemolytic (under anaerobic conditions), facultative anaerobic member of the genus *Streptococcus*. They are usually found in pairs (diplococci) and do not form spores and are nonmotile. *S. pneumoniae* can reside asymptomatically in healthy carriers typically colonizing the respiratory tract, sinuses, and nasal cavity. However, in susceptible individuals with weaker immune systems, such as the elderly and young children, the bacterium may become pathogenic and spread to other locations to cause disease. It spreads by direct person-to-person contact via respiratory droplets and by autoinoculation in persons carrying the bacteria in their upper respiratory tracts. It can be a cause of neonatal infections. *S. pneumoniae* is the main cause of community acquired pneumonia and meningitis in children and the elderly, and of sepsis in those infected with HIV. The organism also causes many types of pneumococcal infections other than pneumonia. These invasive pneumococcal diseases include bronchitis, rhinitis, acute sinusitis, otitis media, conjunctivitis, meningitis, sepsis, osteomyelitis, septic arthritis, endocarditis, peritonitis, pericarditis, cellulitis, and brain abscess.

*S. pneumoniae* can be differentiated from the *viridans* streptococci, some of which are also alpha-hemolytic, using an optochin test, as *S. pneumoniae* is optochin-sensitive. *S. pneumoniae* can also be distinguished based on its sensitivity to lysis by bile, the so-called "bile solubility test". The encapsulated, Gram-positive, coccoid bacteria have a distinctive morphology on Gram stain, lancet-shaped diplococci. They have a polysaccharide capsule that acts as a virulence factor for the organism; more than 90 different serotypes are known, and these types differ in virulence, prevalence, and extent of drug resistance.

Pneumonia is the most common of the *S. pneumoniae* diseases which include symptoms such as fever and chills, cough, rapid breathing, difficulty breathing, and chest pain. For some subjects, such as the elderly, they may include confusion, low alertness, and the former listed symptoms to a lesser degree.

Pneumococcal meningitis is an infection of the tissue covering the brain and spinal cord. Symptoms include stiff neck, fever, headache, confusion, and photophobia. Sepsis is caused by overwhelming response to an infection and leads to tissue damage, organ failure, and even death. The symptoms include confusion, shortness of breath, elevated heart rate, pain or discomfort, over-perspiration, fever, shivering, or feeling cold.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Unless otherwise noted, technical terms are used according to conventional usage. Definitions of common terms in molecular biology can be found in Benjamin Lewin, Genes IX, published by Jones and Bartlet, 2008 (ISBN 0763752223); Kendrew et al. (eds.), The Encyclopedia of Molecular Biology, published by Blackwell Science Ltd., 1994 (ISBN 0632021829); and Robert A. Meyers (ed.), Molecular Biology and Biotechnology: a Comprehensive Desk Reference, published by VCH Publishers, Inc., 1995 (ISBN 9780471185710); and other similar references.

Suitable methods and materials for the practice or testing of this disclosure are described below. Such methods and materials are illustrative only and are not intended to be limiting. Although methods and materials similar or equivalent to those described herein can be used in the practice or testing of the present disclosure, suitable methods and materials are described below. All publications, patent applications, patents, and other references mentioned herein are incorporated by reference in their entirety. Unless otherwise defined, all technical terms used herein have the same meaning as commonly understood. Other methods and materials similar or equivalent to those described herein can be used. For example, conventional methods well known in the art to which this disclosure pertains are described in various general and more specific references, including, for example, Sambrook et al., Molecular Cloning: A Laboratory Manual, 2d ed., Cold Spring Harbor Laboratory Press, 1989; Sambrook et al., Molecular Cloning: A Laboratory Manual, 3d ed., Cold Spring Harbor Press, 2001; Ausubel et al., Current Protocols in Molecular Biology, Greene Publishing Associates, 1992 (and Supplements to 2000); Ausubel et al., Short Protocols in Molecular Biology: A Compendium of Methods from Current Protocols in Molecular Biology, 4th ed., Wiley & Sons, 1999. In addition, the materials, methods, and examples are illustrative only and not intended to be limiting.

Compositions

Disclosed herein are compositions that include cyclic CSP1 analogues against ComD1 and ComD2 receptors for treating bacterial infections, such as *Streptococcus* p. infections. In particular, this disclosure is focused on treatment of *S. pneumoniae* infections through targeting the competence regulon, a quorum sensing circuitry that regulates virulence in *S. pneumoniae*. The disclosed cyclic peptide scaffolds mimic the native competence stimulating peptide pheromone, but act in a dominant negative manner, meaning that they inhibit the quorum sensing circuitry and attenuate *S. pneumoniae* virulence. The disclosed compositions can be used to treat bacterial infections, antibiotic resistant pneumococcus infections and/or alleviate adverse side-effects of currently used pneumococcal antibiotics. In some examples, the disclosed compositions are used to pneumonia, bacteremia, sepsis, meningitis, otitis media, and/or other *S. pneumoniae* caused conditions/diseases.

In certain embodiments, a formulation includes an effective amount, such as a therapeutically effective amount of a disclosed cyclic CSP1 and/or CSP2 analogue. In one embodiments, a disclosed analogue is one presented in FIGS. 1-4, Tables 1 and/or 2.

In embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as $X_1$MRLSX$_2$FFX$_3$X$_4$FILX$_5$RKK (SEQ ID NO: 14), wherein $X_1$ can be an A or E, wherein $X_2$ can be a K or A or unnatural amino acid, wherein $X_3$ can be a R or D, wherein $X_4$ can be an E, D or K and $X_5$ can be a Q or D.

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSKFFRDFILQRKK (SEQ ID NO: 1).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as AMRLSKFFRDFILQRKK (SEQ ID NO: 3).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSAFFRDFILQRKK (SEQ ID NO: 4).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as AMRLSX$_2$FFREFILQRKK (SEQ ID NO: 7), wherein $X_2$ is a non-natural amino acid, such as Dab, Dap or ORN.

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSKFFDDFILQRKK (SEQ ID NO: 8).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSKFFRKFILDRKK (SEQ ID NO: 9).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSKFFRDFILDRKK (SEQ ID NO: 10).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSX$_1$FFRDFILQRKK (SEQ ID NO: 11), wherein $X_1$ is a non-natural amino acid selected from the group consisting of Dab, Dap or ORN.

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSKFFREFILQRKK (SEQ ID NO: 12).

In certain embodiments, a disclosed cyclic CSPlanalogue comprises, consists essentially of, and/or consists of, an amino acid sequence that is at least 95% identical, such as at least 96%, at least 97%, at least 98%, at least 99%, or even 100% identical to the amino acid sequence set forth as EMRLSX$_1$FFREFILQRKK (SEQ ID NO: 13), wherein $X_1$ is a non-natural amino acid selected from the group consisting of Dab, Dap or ORN.

In certain embodiments, a disclosed cyclic CSP2 analogue comprises, consists essentially of, and/or consists of, an amino acid sequence that is at least 95% identical, such as at least 96%, at least 97%, at least 98%, at least 99%, or even 100% identical to the amino acid sequence set forth as XiMRISRIILdFLFLRKK (SEQ ID NO: 15), wherein $X_1$ is an E or A.

In certain embodiments, a disclosed cyclic CSP2 analogue comprises, consists essentially of, and/or consists of, an amino acid sequence that is at least 95% identical, such as at least 96%, at least 97%, at least 98%, at least 99%, or even 100% identical to the amino acid sequence set forth as EMRISRIILdFLFLRKK (SEQ ID NO: 5).

In certain embodiments, a disclosed cyclic CSP2 analogue comprises, consists essentially of, and/or consists of, an amino acid sequence that is at least 95% identical, such as at least 96%, at least 97%, at least 98%, at least 99%, or even 100% identical to the amino acid sequence set forth as AMRISRIILdFLFLRKK (SEQ ID NO: 6).

The disclosed isolated peptides include synthetic embodiments of peptides described herein. In addition, analogs (non-peptide organic molecules), derivatives (chemically functionalized peptide molecules obtained starting with the disclosed peptide sequences) and variants (homologs) of these peptides can be utilized in the compositions and methods described herein. Each peptide of this disclosure is comprised of a sequence of amino acids, which may be either L- and/or D-amino acids, naturally occurring and otherwise as indicated. A D-amino acid, is indicated by a lower case d.

Peptides can be modified by a variety of chemical techniques to produce derivatives having essentially the same activity as the unmodified peptides, and optionally having other desirable properties. In another example, carboxylic acid groups of the protein, whether carboxyl-terminal or side chain, can be provided in the form of a salt of a pharmaceutically-acceptable cation or esterified to form a C1-C16 ester, or converted to an amide of formula NR1R2 wherein R1 and R2 are each independently H or C1-C16 alkyl, or combined to form a heterocyclic ring, such as a 5- or 6-membered ring. Amino groups of the peptide, whether amino-terminal or side chain, can be in the form of a pharmaceutically-acceptable acid addition salt, such as the HCl, HBr, acetic, benzoic, toluene sulfonic, maleic, tartaric and other organic salts, or can be modified to C1-C16 alkyl or dialkyl amino or further converted to an amide.

Hydroxyl groups of the peptide side chains may be converted to C1-C16 alkoxy or to a C1-C16 ester using well-recognized techniques. Phenyl and phenolic rings of the peptide side chains may be substituted with one or more halogen atoms, such as fluorine, chlorine, bromine or iodine, or with C1-C16 alkyl, C1-C16 alkoxy, carboxylic acids and esters thereof, or amides of such carboxylic acids. Methylene groups of the peptide side chains can be extended to homologous C2-C4 alkylenes. Thiols can be protected with any one of a number of well-recognized protecting groups, such as acetamide groups. Those skilled in the art will also recognize methods for introducing cyclic structures into the peptides to select and provide conformational constraints to the structure that result in enhanced stability.

Peptidomimetic and organomimetic embodiments are envisioned, whereby the three-dimensional arrangement of the chemical constituents of such peptido- and organomimetics mimic the three-dimensional arrangement of the peptide backbone and component amino acid side chains, resulting in such peptido- and organomimetics of a peptide having measurable desired activity. For computer modeling applications, a pharmacophore is an idealized three-dimensional definition of the structural requirements for biological activity. Peptido- and organomimetics can be designed to fit each pharmacophore with current computer modeling software.

In embodiments, a disclosed polypeptide is included in a fusion protein. Thus, the fusion protein can include a disclosed polypeptide and a second heterologous moiety, an enzyme or a carrier (such as a hepatitis carrier protein or bovine serum albumin) covalently linked to the polypeptide. A second heterologous moiety can be covalently or non-covalently linked to the polypeptide. The polypeptide can be included in a fusion protein and can also include heterologous sequences.

Nucleic acids encoding one or more disclosed polypeptides are envisioned. These polynucleotides include DNA, cDNA and RNA sequences which encode the peptide(s) of interest. Nucleic acid molecules encoding these peptides can readily be produced by one of skill in the art, using the amino acid sequences provided herein, and the genetic code. In addition, one of skill can readily construct a variety of clones containing functionally equivalent nucleic acids, such as nucleic acids which differ in sequence but which encode the same peptide.

Nucleic acid sequences encoding one or more disclosed polypeptides can be prepared by any suitable method including, for example, cloning of appropriate sequences or by direct chemical synthesis by methods such as the phosphotriester method of Narang et al., Meth. Enzymol. 68:90-99, 1979; the phosphodiester method of Brown et al., Meth. Enzymol. 68: 109-151, 1979; the diethylphosphoramidite method of Beaucage et al., Tetra. Lett. 22: 1859-1862, 1981 the solid phase phosphoramidite triester method described by Beaucage & Caruthers, Tetra. Letts. 22(20): 1859-1862, 1981, for example, using an automated synthesizer as described in, for example, Needham-VanDevanter et al., Nucl. Acids Res. 12:6159-6168, 1984; and, the solid support method of U.S. Pat. No. 4,458,066. Chemical synthesis produces a single stranded oligonucleotide. This can be converted into double stranded DNA by hybridization with a complementary sequence, or by polymerization with a DNA polymerase using the single strand as a template.

Exemplary nucleic acids including sequences encoding one or more polypeptide disclosed herein can be prepared by cloning techniques or chemical synthesis. Examples of appropriate cloning and sequencing techniques, and instructions sufficient to direct persons of skill through cloning are found in Sambrook et al., supra, Berger and Kimmel (eds.), supra, and Ausubel, supra. Product information from manufacturers of biological reagents and experimental equipment also provide useful information. Such manufacturers include the SIGMA Chemical Company (Saint Louis, MO), R&D Systems (Minneapolis, MN), Pharmacia Amersham (Piscataway, NJ), CLONTECH Laboratories, Inc. (Palo Alto, CA), Chem Genes Corp., Aldrich Chemical Company (Milwaukee, WI), Glen Research, Inc., GIBCO BRL Life Technologies, Inc. (Gaithersburg, MD), Fluka Chemica-Biochemika Analytika (Fluka Chemie AG, Buchs, Switzerland), Invitrogen (San Diego, CA), and Applied Biosystems (Foster City, CA), as well as many other commercial sources known to one of skill.

Once the nucleic acids encoding one or more disclosed polypeptides are isolated and cloned, the peptide can be expressed in a recombinantly-engineered cell such as bacteria, plant, yeast, insect and mammalian cells using a suitable expression vector or expressed in a viral vector for therapeutic approaches—e.g., Adeno-associated viral (AAV) vector expression. One or more DNA sequences encoding one or more immunogenic peptide can be expressed in vitro by DNA transfer into a suitable host cell. The cell may be prokaryotic or eukaryotic. The term also includes any progeny of the subject host cell. It is understood that all progeny may not be identical to the parental cell since there may be mutations that occur during replication. Methods of stable transfer, meaning that the foreign DNA is continuously maintained in the host, are known in the art. In one example a vector is an adeno-associated virus (AAV) vector.

Polynucleotide sequences encoding one or more disclosed polypeptides can be operatively linked to expression control sequences (e.g., a promoter). An expression control sequence operatively linked to a coding sequence is ligated such that expression of the coding sequence is achieved under conditions compatible with the expression control sequences. The expression control sequences include, but are not limited to appropriate promoters, enhancers, transcription terminators, a start codon (i.e., ATG) in front of a protein-encoding gene, splicing signal for introns, maintenance of the correct reading frame of that gene to permit proper translation of mRNA, and stop codons.

The polynucleotide sequences encoding one or more disclosed polypeptides can be inserted into an expression vector including, but not limited to a plasmid, virus or other vehicle that can be manipulated to allow insertion or incorporation of sequences and can be expressed in either prokaryotes or eukaryotes. Hosts can include microbial, yeast, insect and mammalian organisms. Methods of expressing DNA sequences having eukaryotic or viral sequences in prokaryotes are well known in the art. Biologically functional viral and plasmid DNA vectors capable of expression and replication in a host are known in the art.

In an aspect, a composition disclosed herein comprises nucleic acid molecules that encode the disclosed-derived peptides or fragments thereof disclosed herein in an expression construct or in a single or separate cassette. Disclosed herein is an expression construct capable of expressing serpin-derived peptides or fragments thereof.

A disclosed expression cassette can include 5' and 3' regulatory sequences operably linked to a polynucleotide disclosed herein. "Operably linked" is intended to mean a functional linkage between two or more elements. For example, an operable linkage between a polynucleotide disclosed herein and a regulatory sequence (e.g., a promoter) is a functional link that allows for expression of a polynucleotide disclosed herein. Operably linked elements can be contiguous or non-contiguous. When used to refer to the joining of two protein coding regions, by operably linked is intended that the coding regions are in the same reading frame. An expression cassette may further comprise at least one additional polynucleotide to be co-transformed into the organism. Alternatively, one or more polypeptide(s) can be expressed on one or more expression cassettes. Expression cassettes can be provided with a plurality of restriction sites and/or recombination sites for insertion of the polynucleotide to be under the transcriptional regulation of the regulatory regions.

The regulatory regions (i.e., promoters, transcriptional regulatory regions, and translational termination regions) and/or the polynucleotides disclosed herein can be native/analogous to the host cell or to each other. Alternatively, the regulatory regions and/or the polynucleotide employed in the invention can be heterologous to the host cell or to each other. As used herein, "heterologous" in reference to a sequence is a sequence that originates from a foreign species, or, if from the same species, is substantially modified from its native form in composition and/or genomic locus by deliberate human intervention. For example, a promoter operably linked to a heterologous polynucleotide is from a species different from the species from which the polynucleotide was derived, or, if from the same/analogous species, one or both are substantially modified from their original form and/or genomic locus, or the promoter is not the native promoter for the operably linked polynucleotide. As used herein, a chimeric gene comprises a coding sequence operably linked to a transcription initiation region that is heterologous to the coding sequence.

In preparing the expression cassette, the various DNA fragments can be manipulated, so as to provide for the DNA sequences in the proper orientation and, as appropriate, in the proper reading frame. Toward this end, adapters or linkers can be employed to join the DNA fragments or other manipulations can be involved to provide for convenient restriction sites, removal of superfluous DNA, removal of restriction sites, or the like. For this purpose, in vitro mutagenesis, primer repair, restriction, annealing, resubstitutions, e.g., transitions and transversions, can be involved, A number of promoters can be used in the practice of the invention. The promoters can be selected based on the desired outcome. The choice of promoters depends on several factors including but not limited to efficiency, selectability, inducibility, desired expression level, and cell- or tissue-preferential expression. The nucleic acids can be combined with constitutive, tissue-preferred, inducible, or other promoters for expression in the host organism. One skilled in the art is capable of appropriately selecting and positioning promoters and other regulator regions relative to the coding sequence.

In addition to disclosed polypeptide and/or nucleic acids encoding the disclosed polypeptides, the formulations can further comprises one or more carriers and/or active ingredients. In some examples, an active ingredient is an antibiotic. In some examples, an antibiotic (or more than one antibiotic) and the disclosed peptide is administered to a subject. The administration of an antibiotic or fragment thereof and a disclosed peptide can occur in any order or even simultaneously, for example by co-administration as a single pharmaceutical preparation, or as multiple preparations, such as a pharmaceutical composition that contains a therapeutically effective amount of the peptide and a composition that contains a therapeutically effective amount of an antibiotic that is specific for a pathogen of interest.

In general any antibiotic can be used with the disclosed composition or methods. Examples of antibiotics that can be used include but are not limited to aminoglycosides (such as amikacin, gentamicin, kanamycin, neomycin, netilmicin, streptomycin, tobramycin, and paromomycin); ansamycins (such as geldanamycin, and herbimycin); carbacephems (such as loracarbef, ertapenem, doripenem, imipenem/cilastatin, and meropenem); cephalosporins (such as cefadroxil, cefazolin, cefalotin, cefalexin, cefaclor, cefamandole, cefoxitin, cefprozil, cefuroxime, cefixime, cefdinir, cefditoren, cefoperazone, cefotaxime, cefpodoxime, ceftazidime, ceftibuten, ceftizoxime, ceftriaxone, cefepime, and ceftobiprole); glycopeptides (such as teicoplanin and vancomycin); macrolides (such as azithromycin, clarithromycin, dirithromycin, erythromycin, roxithromycin, troleandomycin, telithromycin, and spectinomycin); monobactams (such as aztreonam); penicillins (such as amoxicillin, ampicillin, azlocillin, carbenicillin, cloxacillin, dicloxacillin, flucloxacillin, mezlocillin, meticillin, amoxycillin, clavamox, clavulanic acid, nafcillin, oxacillin, penicillin, piperacillin, and ticarcillin); peptides (such as bacitracin, colistin, and polymyxin b); quinolones (such as ciprofloxacin, enoxacin, gatifloxacin, levofloxacin, lomefloxacin, moxifloxacin, norfloxacin, ofloxacin, trovafloxacin, grepafloxacin, and sparfloxacin); sulfonamides (such as mafenide, prontosil (archaic), sulfacetamide, sulfamethizole, sulfanilimide (archaic), sulfasalazine, sulfisoxazole, trimethoprim, and trimethoprim-sulfamethoxazole); tetracyclines (such as demeclocycline, doxycycline, minocycline, oxytetracycline, and tetracycline); and others (such as arsphenamine, chloramphenicol, clindamycin, lincomycin, ethambutol, fosfomycin, fusidic acid, furazolidone, isoniazid, linezolid, metronidazole, mupirocin, nitrofurantoin, platensimycin, pyrazinamide, quinupristin/dalfopristin, rifampicin, thiamphenicol, and tinidazole) or combinations thereof.

Typically, preparation of a pharmaceutical composition (for use as a medicament or in the manufacture of a medicament) entails preparing a pharmaceutical composition that is essentially free of pyrogens, as well as any other impurities that could be harmful to humans or animals. Typically, the pharmaceutical composition contains appropriate salts and buffers to render the components of the composition stable and allow the disclosed peptide to interact with cells of a subject.

Administration of therapeutic compositions can be by any common route as long as the target tissue is available via that route. This includes oral, nasal (such as intranasal), ocular, buccal, enteral, intravitreal, or other mucosal (such as rectal or vaginal) or topical administration. Alternatively, administration will be by orthotopic, intradermal subcutaneous, intramuscular, parenteral, intraperitoneal, or intravenous injection routes. Such pharmaceutical compositions are usually administered as pharmaceutically acceptable compositions that include physiologically acceptable carriers, buffers or other excipients.

Therapeutic compositions can be provided as parenteral compositions, such as for injection or infusion. Such compositions are formulated generally by mixing P4 peptide at the desired degree of purity, in a unit dosage injectable form (solution, suspension, or emulsion), with a pharmaceutically acceptable carrier, for example one that is non-toxic to recipients at the dosages and concentrations employed and is compatible with other ingredients of the formulation. In addition, peptides (and/or antibiotic) can be suspended in an aqueous carrier, for example, in an isotonic buffer solution at a pH of about 3.0 to about 8.0, preferably at a pH of about 3.5 to about 7.4, 3.5 to 6.0, or 3.5 to about 5.0. Useful buffers include sodium citrate-citric acid and sodium phosphate-phosphoric acid, and sodium acetate/acetic acid buffers. The peptide, optionally together with excipients and/or antibiotic, can also be in the form of a lyophilisate and can be made into a solution prior to parenteral administration by the addition of suitable solvents. Solutions such as those that are used, for example, for parenteral administration can also be used as infusion solutions.

Pharmaceutical compositions can include an effective amount (such as a therapeutically effective amount) of disclosed peptide, complement protein, antibiotic, and/or opsonic antibodies (for example, dissolved or suspended) in a pharmaceutically acceptable carrier or excipient. Pharmaceutically acceptable carriers and/or pharmaceutically acceptable excipients are known in the art and are described, for example, in Remington's Pharmaceutical Sciences, by E. W. Martin, Mack Publishing Co., Easton, Pa., 17th Edition (1995).

The nature of the carrier will depend on the particular mode of administration being employed. For example, parenteral formulations usually contain injectable fluids that include pharmaceutically and physiologically acceptable fluids such as water, physiological saline, balanced salt solutions, aqueous dextrose, glycerol or the like as a vehicle. For solid compositions (such as powder, pill, tablet, or capsule forms), conventional non-toxic solid carriers can include, for example, pharmaceutical grades of mannitol, lactose, starch or magnesium stearate. In addition, pharmaceutical compositions to be administered can contain minor amounts of non-toxic auxiliary substances, such as wetting or emulsifying agents, preservatives, and pH buffering agents and the like, for example sodium acetate or sorbitan monolaurate.

As used herein, "pharmaceutically acceptable carrier" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the active ingredient, its use in the pharmaceutical compositions is contemplated. Supplementary active ingredients also can be incorporated into the compositions. For example, certain pharmaceutical compositions can include peptide in water, mixed with a suitable surfactant, such as hydroxypropylcellulose. Dispersions also can be prepared in glycerol, liquid polyethylene glycols, and mixtures thereof and in oils. Under ordinary conditions of storage and use, these preparations contain a preservative to prevent the growth of microorganisms.

Additional formulations are suitable for oral administration. Oral formulations can include excipients such as, pharmaceutical grades of mannitol, lactose, starch, magnesium stearate, sodium saccharine, cellulose, magnesium carbonate and the like. The compositions (medicaments) typically take the form of solutions, suspensions, aerosols or powders. Exemplary formulations can be found in U.S. Patent publication No. 20020031527. When the route is topical, the form may be a cream, ointment, salve or spray.

Typical subjects intended for treatment with the pharmaceutical compositions and methods of the present disclosure include humans, as well as non-human primates and other animals. To identify subjects for prophylaxis or treatment according to the methods of the disclosure, accepted screening methods are employed to determine risk factors associated with a targeted or suspected disease or condition (for example, an infection associated with a particular pathogen of interest) or to determine the status of an existing disease or condition in a subject. These screening methods include, for example, diagnostic methods, such as various ELISA and other immunoassay methods, which are available and well known in the art to detect and/or characterize disease-associated markers. These and other routine methods allow the clinician to select patients in need of therapy using the methods and pharmaceutical compositions of the disclosure.

An effective amount of the pharmaceutical composition is determined based on the intended goal, for example to inhibit and/or treat a pathogenic infection of a human or non-human subject. The administration of the pharmaceutical compositions of the disclosure can be for either prophylactic or therapeutic purpose. When provided prophylactically, the pharmaceutical composition is provided in advance of any symptom. The prophylactic administration of the compound serves to prevent or ameliorate any subsequent disease process. When provided therapeutically, the compound is provided at (or shortly after) the onset of a symptom of disease or infection.

For prophylactic and therapeutic purposes, the pharmaceutical compositions can be administered to the subject in a single bolus delivery, via continuous delivery (for example, continuous transdermal, mucosal or intravenous delivery) over an extended time period, or in a repeated administration protocol (for example, by an hourly, daily or weekly, repeated administration protocol). The therapeutically effective dosage of the compound can be provided as repeated doses within a prolonged prophylaxis or treatment regimen that will yield clinically significant results to alleviate one or more symptoms or detectable conditions associated with a targeted disease or condition as set forth herein. Determination of effective dosages in this context is typically based on animal model studies followed up by human clinical trials and is guided by administration protocols that significantly reduce the occurrence or severity of targeted disease symptoms or conditions in the subject. Suitable models in this regard include, for example, murine, rat, porcine, feline, non-human primate, and other accepted animal model subjects known in the art. Alternatively, effective dosages can be determined using in vitro models (for example, immunologic and histopathologic assays). Using such models, only ordinary calculations and adjustments are required to determine an appropriate concentration and dose to administer a therapeutically effective amount of the peptide (for example, amounts that are effective to alleviate one or more symptoms of a targeted infection).

The appropriate dose will vary depending on the characteristics of the subject, for example, whether the subject is a human or non-human, the age, weight, and other health considerations pertaining to the condition or status of the subject, the mode, route of administration, and number of doses, and whether the pharmaceutical composition includes both peptide alone or in conjunction with an antibiotic, time and route of administration, other drugs or treatments being administered concurrently, as well as the specific pharmacology of the therapeutic compositions for eliciting the desired activity or biological response in the subject. Dosage regimens can be adjusted to provide an optimum prophylactic or therapeutic response. A therapeutically effective amount is also one in which any toxic or detrimental side effects of the compound and/or other biologically active agent is outweighed in clinical terms by therapeutically beneficial effects. A non-limiting range for a therapeutically effective amount of a peptide and/or other biologically active agent within the methods and formulations of the disclosure is about 0.01 mg/kg body weight to about 10 mg/kg body weight, such as about 0.05 mg/kg to about 5 mg/kg body weight, or about 0.2 mg/kg to about 2 mg/kg body weight.

In particular examples, therapeutic compositions including a disclosed therapeutic agent are administered by sustained-release systems. Suitable examples of sustained-release systems include suitable polymeric materials (such as, semi-permeable polymer matrices in the form of shaped articles, for example films, or mirocapsules), suitable hydrophobic materials (for example as an emulsion in an acceptable oil) or ion exchange resins, and sparingly soluble derivatives (such as, for example, a sparingly soluble salt). Sustained-release compositions can be administered orally, parenterally, intracistemally, intraperitoneally, topically (as by powders, ointments, gels, drops or transdermal patch), or as an oral or nasal spray. Sustained-release matrices include polylactides (U.S. Pat. No. 3,773,919, EP 58,481), copolymers of L-glutamic acid and gamma-ethyl-L-glutamate (Sidman et al., Biopolymers 22:547-556, 1983), poly(2-hydroxyethyl methacrylate) (Langer et al., J. Biomed. Mater. Res. 15:167-277, 1981; Langer, Chem. Tech. 12:98-105, 1982), ethylene vinyl acetate (Langer et al., Id.) or poly-D-(−)-3-hydroxybutyric acid (EP 133,988).

Polymers can be used for ion-controlled release. Various degradable and nondegradable polymeric matrices for use in controlled drug delivery are known in the art (Langer, Accounts Chem. Res. 26:537, 1993). For example, the block copolymer, polaxamer 407 exists as a viscous yet mobile liquid at low temperatures but forms a semisolid gel at body temperature. It has shown to be an effective vehicle for formulation and sustained delivery of recombinant interleukin-2 and urease (Johnston et al., Pharm. Res. 9:425, 1992; and Pec, J. Parent. Sci. Tech. 44(2):58, 1990). Alternatively, hydroxyapatite has been used as a microcarrier for controlled release of proteins (Ijntema et al., Int. J. Pharm. 112:215, 1994). In yet another aspect, liposomes are used for controlled release as well as drug targeting of the lipid-capsulated drug (Betageri et al., Liposome Drug Delivery Systems, Technomic Publishing Co., Inc., Lancaster, Pa., 1993). Numerous additional systems for controlled delivery of therapeutic proteins are known (for example, U.S. Pat. Nos. 5,055,303; 5,188,837; 4,235,871; 4,501,728; 4,837,028; 4,957,735; and 5,019,369; 5,055,303; 5,514,670; 5,413,797; 5,268,164; 5,004,697; 4,902,505; 5,506,206; 5,271,961; 5,254,342; and 5,534,496).

The pharmaceutical compositions (medicaments) can be prepared for use in prophylactic regimens and administered to human or non-human subjects to protect against infection by a pathogen (or a plurality of pathogens). Thus, the pharmaceutical compositions typically contain a pharmaceutically effective amount of a disclosed peptide and optionally a pharmaceutically effective amount of antibiotic. In some cases the compositions are administered following infection, for example to treat the infection an increase pathogen clearance, in such applications, the pharmaceutical composition is administered in a therapeutically effective amount. A therapeutically effective amount is a quantity of a composition used to achieve a desired effect in a subject. For instance, this can be the amount of the composition necessary to inhibit infection by a pathogen, to increase pathogen clearance from the subject or to prevent or measurably alter outward symptoms of pathogen infection from a subject. When administered to a subject, a dosage will generally be used that will achieve target tissue concentrations that has been shown to achieve an in vitro or in vivo effect.

Methods of Use

Any of compositions and/or formulations described herein can be used for attenuate *S. pneumoniae* virulence in a subject in need of the treatment. The results disclosed herein indicate that treatment of *S. pneumoniae* infections with dominant negative competence stimulating peptide analogs attenuate pneumococcal infections, while at the same time inhibit the ability of the bacteria to acquire antibiotic resistance. The disclosed compositions can be used to treat bacterial infections, antibiotic resistant pneumococcus infections and/or alleviate adverse side-effects of currently used pneumococcal antibiotics. In some examples, the disclosed compositions are used to pneumonia, bacteremia, sepsis, meningitis, otitis media, and/or other *S. pneumoniae* caused conditions/diseases. The dosage and administration regimen for the described method will depend on the nature and condition being treated, the age and condition of the patient, and any prior or concurrent therapy.

In some examples, the disclosed compositions are used to prevent, treat, and/or reduce community acquired pneumonia (CAP). CAP is a significant cause of morbidity and mortality in the U.S., affecting ~one million patients of all ages, particularly the elderly, costing >$10 billion in 2011. *Streptococcus pneumoniae* (pneumococcus) is a major cause of CAP, pneumonia-derived sepsis (pneumonic sepsis), meningitis and otitis media. Vaccination remains the best practice to prevent pneumococcal diseases. However, full coverage of ≥90 serotypes with currently licensed 23-valent capsular polysaccharide vaccine (Pneumovax) and conjugated vaccines PCV7 (Prevnar), PCV10 (Synflorix) and PCV13 (Prevnar 13), is not feasible. Because pneumococcus is highly recombinogenic, vaccine escape through "capsule switching" to non-vaccine serotypes has emerged. Resistance to various antibiotics, including penicillins and macrolides, is widespread. These problems have hampered eradication of pneumococcal diseases. The burden associated with pneumococcal infections remains high with >20,000 deaths, >400,000 hospitalizations, and direct medical costs totaled approximately $3.5 billion a year in the United States alone. Pneumococcus is responsible for ~175,000 cases of CAP annually that require hospitalization. Of these, approximately 50,000 cases progress to pneumonic sepsis and post-sepsis multi-organ dysfunction, with 20-30% mortality.

In some examples, the disclosed compositions are used to prevent, treat, and/or reduce pneumococcus pneumonic sepsis and multi-organ dysfunction. Up to ⅓ of patients with pneumococcal pneumonic sepsis experience dysfunction in major organs. Pulmonary complications include respiratory failure, pleural effusion, empyema, and a dysfunction of the epithelial sodium transporters (e.g., ENaC) required for edema reabsorption. Cardiac dysfunctions, include major adverse cardiac events (MACE)—heart failure, arrhythmia and infarction—were more recently recognized. In mouse model of acute pneumonic sepsis, pneumococcus invades the myocardium and induce microlesions formation. Pneumococci within microlesions form biofilms that mediate intrinsic resistance to antibiotic killing, enabling them to kill resident cardiac macrophages and subsequently subverting cytokine/chemokine production and neutrophil infiltration into the myocardium. More recently, studies in a non-human primates (NHPs, marquee monkeys) showed that in both NHPs with severe acute pneumonia as well as convalescent NHPs (receiving antibiotic), MACE were detected as indicated by the presence of pneumococcus in myocardium; nonspecific ischemic alterations; increased serum levels of troponin T and heart-type fatty acid binding protein; necroptosis and apoptosis of myocardium, and cardiac scarring.

The subject to be treated can be a human or a non-human mammal. In some embodiments, the subject is a human patient. In some examples, a disclosed composition is co-administered with moxifloxacin, clavulanate or a combination thereof.

Kits

The present disclosure also provides kits for treating *Streptococcus Pneumoniae* infections. Such kits may include one or more containers comprising a formulation as described herein, which comprises a disclosed polypeptide and/or a nucleic acid molecule encoding a disclosed polypeptide.

In some embodiments, the kit may comprise instructions for use in accordance with any of the methods described herein. The kit may further comprise a description of selecting an individual suitable for treatment based on identifying whether that individual has or is at risk of acquiring *Streptococcus Pneumoniae* infections.

The instructions relating to the use generally include information as to dosage, dosing schedule, and route of administration for the intended treatment. The containers may be unit doses, bulk packages (e.g., multi-dose packages) or sub-unit doses. Instructions supplied in the kits of the invention are typically written instructions on a label or package insert (e.g., a paper sheet included in the kit), but machine-readable instructions (e.g., instructions carried on a magnetic or optical storage disk) are also acceptable.

The label or package insert indicates that the composition is used for *Streptococcus Pneumoniae* infections. Instructions may be provided for practicing any of the methods described herein.

The kits of this invention are in suitable packaging. Suitable packaging includes, but is not limited to, vials, bottles, jars, flexible packaging (e.g., sealed Mylar or plastic bags), and the like. At least one active agent in the composition is an active agent selected from the group consisting of a disclosed polypeptide and/or a nucleic acid molecule encoding a disclosed polypeptide.

Kits may optionally provide additional components such as interpretive information. Normally, the kit comprises a container and a label or package insert(s) on or associated with the container. In some embodiments, the invention provides articles of manufacture comprising contents of the kits described above.

The following examples are provided to illustrate particular features of certain embodiments. However, the particular features described below should not be construed as limitations on the scope of the disclosure, but rather as examples from which equivalents will be recognized by those of ordinary skill in the art.

EXAMPLES

Example 1

This example provides designing cyclic competence stimulating peptide (CSP) analogues with novel pan-group inhibition activity in modulating quorum sensing in *Streptococcus pneumoniae*.

Designing Pan-Group Inhibitor

The Circular Dichroism (CD) and 2D-NMR studies showed that an α-helix structure is critical to the ability of CSP to induce quorum sensing response. Specifically, the α-helix structure is important to the formation of two optimal hydrophobic patches that are required for effective ComD1 and ComD2 binding. Additionally, the specific conformation of each side chain in the hydrophobic patch also affects the binding affinity to the receptor. These results indicate that if the conformation of the side chains can be modified in the hydrophobic patch of CSP1 so that the resulting hydrophobic patch resembles the optimal hydrophobic patches for both ComD1 and ComD2 binding, a pan-group activator can be designed. Then, by replacing the Glu1 residue, whose side chain was shown to be critical for receptor activation, with alanine, this pan-group activator can be converted to a pan-group inhibitor. The viability of this approach is supported by CSP1-K6A, an analogue identified as a pan-group activator, that displays a hydrophobic patch resembling both the optimal hydrophobic patches for ComD1 and ComD2 binding. Replacement of Glu1 with alanine in this case, resulted in a peptide, CSP1-E1AK6A, that could only strongly inhibit the ComD1 receptor.

The strategy of modifying the conformation of the hydrophobic patch in CSP1 is to perform side chain cyclization on certain positions in CSP1 to stabilize the α-helix structure. It was hypothesized that systematic macrocycle ring size alteration would allow one to gradually modify the conformation of the α-helix structure, thus fine-tuning the conformation of the hydrophobic patch and the activity of the peptide. Then, once a potent pan-group activator was identified, it would be more likely to convert it into a potent pan-group inhibitor by replacing the Glu1 residue with alanine, due to the stabilized conformation induced by cyclization. Additionally, the incorporation of peptide cyclization would likely improve the proteolytic stability of CSP1, as constraining the α-helix structure can significantly enhance the proteolytic stability of the peptide.

The sixth and tenth positions were selected to perform cyclization (See FIG. 1A for the amino acid sequence of CSP1). First, the distance between sixth and tenth position is about one helical turn, a good distance for constraining the α-helix structure. Second, the 2D-NMR structure of CSP1 showed that the side chains of sixth and tenth residues are located at the opposite side of the hydrophobic patch. Therefore, cyclizing these two side chains will also minimize the interference of the interaction between the hydrophobic patch and the receptor. Lastly, Lys6 and Asp10 already bear functional groups on the side chains, namely free amine and carboxyl group respectively, that are suitable for new covalent bond formation. Therefore, cyclizing these two residues will cause least change to the original sequence, thus conserving the important interactions of other residues. On the other hand, selecting any other positions in CSP1 sequence for cyclization will force at least one residue to be replaced by nonnative amino acid. These replacements alone may cause significant reduction in activity. To test this, other combinations were selected such as sixth to ninth, tenth to fourteenth, and sixth to fourteenth for cyclization. These positions selected bear side chains that are considered nonessential to the activity of the peptide based on our previous alanine scan and D-amino acid scan results. However, replacing these residues with either Lys or Asp that are required for cyclization significantly attenuate the activity of the peptide. For example, when one tried to cyclize sixth and ninth positions, one had to replace Arg9 with Asp, causing more than 100-fold reduction in potency against ComD1 receptor. Cyclization of Lys6 and Asp9 caused further reduction in activity. Therefore, cyclizing sixth and tenth positions is more advantageous than any other positions in the CSP1.

Next, lysine-like amino acids were added including lysine that all have free amine on the side chain but vary in side chain length, on sixth position, and keep the original Asp on the tenth position. This series of cyclization results in four cyclic peptides, none of which is pan-group activator (See Table 1). However, from CSP1-cyc(K6D10) to CSP1-cyc(Dap6D10), as the size of the macrocycle decreases, the potency of the peptide against the ComD1 receptor gradually increases, reaches peak at CSP1-cyc(Dab6D10) and then starts to drop, indicating that the size of the macrocycle in CSP1-cyc(Dab610) is close to the optimal size of the macrocycle that is required to form the proposed hydrophobic patch for effective ComD1 binding, and that we can indeed fine-tune the activity of the peptide by gradually varying the size of the macrocycle. This series of cyclization did not significantly affect the activity against ComD2 receptor. To further pursue the goal of identifying a potent pan-group inhibitor, another series of cyclization were performed. The same amino acids were added in the sixth position as in last series of cyclization, while adding Glu in the tenth position instead of Asp (See FIG. 1A). It was hypothesized that as the carbonyl moved further away from the backbone, it will cause subtle change to the conformation, thus further fine-tuning the activity of the peptide. This series of cyclization resulted in two potent pan-group activators, especially CSP1-cyc(Dap6E10), that exhibits activity against the ComD1 receptor comparable to CSP1, and a potency against ComD2 receptor about 4-fold higher than CSP2. Additionally, CSP1-cyc(Dap6E10) and CSP1-cyc(Dab6D10) have very similar size of macrocycle. However, CSP1-cyc(Dap6E10) is more potent than CSP1-cyc(Dab6D10), especially against the ComD2 receptor. This is likely due to the position change of the amide bond in the macrocycle linker, causing subtle conformational changes to the hydrophobic patch. Next, Glu1 was replaced in CSP1-cyc(Dab6E10) and CSP1-cyc(Dap6E10) to convert them into pan-group inhibitors. The results revealed that CSP1-E1A-cyc(Dap6E10) (FIG. 1B) displays inhibition potency against the ComD1 receptor comparable to the most potent ComD1 inhibitor, CSP1-E1A, and inhibition potency against the ComD2 receptor only 3-fold less than the most potent ComD2 inhibitor, CSP2-E1Ad10, making it the first potent pan-group inhibitor of pneumococcal QS (see FIG. 1B).

TABLE 1

EC50/IC50 values of cyclic CSP1 analogues against ComD1 and ComD2 receptors.

| Name/SEQ ID NO: | $EC_{50}/IC_{50}$ (nM)[b] (95% CI[c]) | |
| --- | --- | --- |
| | ComD1 | ComD2 |
| CSP1 (SEQ ID NO: 1) | 10.3 (6.27-16.8) | 526 (498-556) |
| CSP2 (SEQ ID NO: 2) | 1650 (1190-2300) | 50.7 (40.6-63.2) |
| CSP1-cyc(K6D9) | >1000 | 528 (211-1318) |
| CSP1-cyc(K10D14) | 257 (196-340) | —[d] |
| CSP1-cyc(K6D14) | >1000 | >1000 |
| CSP1-cyc(K6D10) | 258 (203-328) | >1000 |
| CSP1-cyc(Orn6D10) | 193 (136-275) | >1000 |
| CSP1-cyc(Dab6D10) | 59.5 (38.1-93.2) | >1000 |
| CSP1-cyc(Dap6D10) | 435 (237-796) | >1000 |
| CSP1-cyc(K6E10) | 350 (259-474) | >1000 |
| CSP1-cyc(Orn6E10) | 422 (386-461) | >1000 |
| CSP1-cyc(Dab6E10) | 12.2 (11.1-13.6) | 31.4 (29.3-3.7) |
| CSP1-cyc(Dap6E10) | 14.6 (9.27-23.1) | 13.1 (6.79-25.1) |
| CSP1-E1A-cyc(Dab6E10) | 173 (136-221) * | >1000 |
| CSP1-E1A-cyc(Dap6E10) | 75.8 (49.9-115) | 182 (132-251) |
| CSP1-E1A-des-K16K17-cyc(Dap6E10) | 7.57 (3.60-15.9) | 67.2 (42.0-107) |

See experimental section for detail of reporter strains and methods. See supporting information for plots of agonism or antagonism dose response curves. All assays performed in triplicate.
[b]EC50 or IC50 values determined by testing peptides over a range of concentrations.
[c]95% confidence interval.
[d]EC50 not determined due to the analogue's low activity.
* IC50 value (bold font)

2D-NMR Analysis of Select Cyclic Peptide Analogs.

As mentioned above, it was hypothesized that by changing the size of the macrocycle, we can modify the conformation of the hydrophobic patch until it resembles the two proposed hydrophobic patches required for effective ComD1 and ComD2 binding, leading to pan-group activators or inhibitors. To test whether the structure-activity profile of the cyclic peptides is consistent with the proposed hydrophobic patches, four cyclic peptide analogues were selected and structures were analyzed using 2D-NMR spectroscopy. The hydrophobic patch of the cyclic peptides was overlaid with the two proposed hydrophobic patches to examine their similarities.

First, the hydrophobic patch of the cyclic peptide was compared with the proposed hydrophobic patch for effective ComD1 binding (See FIG. 2A-2D). CSP1-cyc(K6D10) is a weak ComD1 activator, which has an EC50 value of 258 nM and 44% of maximal induction of comX compared to CSP1. Therefore, it was hypothesized that CSP1-cyc(K6D10) would exhibit a significantly different hydrophobic patch compared to the one CSP1 displays. Indeed, the hydrophobic patch of CSP1-cyc(K6D10) align poorly with that of CSP1, with only the L4 and F11 residues aligned relatively well. CSP1-cyc(Orn610), which has an EC50 value of 193 nM and 100% of maximal induction of comX compared to CSP1, showed significantly improved activity compared to CSP1-cyc(K6D10). Consistent with the trend, the hydrophobic patch of CSP1-cyc(Orn6D10) aligned better with the CSP1 patch, with the exception of the I12 residues. Lastly, CSP1-cyc(Dab6E10) and CSP1-cyc(Dap6E10), both of which exhibit 10-fold higher potency than CSP1-cyc (Orn6D10) and 100% of maximal induction of comX compared to CSP1, possess hydrophobic patches that align very well with the CSP1 patch, for all five residues (L4, F7, F8, F11 and I12).

Next, the hydrophobic patches of the cyclic peptides were compared with the proposed hydrophobic patch for effective ComD2 binding (See FIG. 3A-3D). Since CSP1-cyc (Dab6E10) and CSP1-cyc(Dap6E10) are very potent ComD2 activators, it was hypothesized that their hydrophobic patches would align well with the hydrophobic patch that CSP2-d10 exhibits, the most potent ComD2 activator identified to date. Indeed, it was found that the F7, F8, F11 and I12 residues in both cyclic peptides overlay well with the 18, L9, F11 and L12 residues in CSP2-d10. Interestingly, a closer examination revealed that the L13 residue in both CSP1-cyc(Dab6E10) and CSP1-cyc(Dap6E10), which was not considered part of the hydrophobic patch in CSP1 analogues that is critical to ComD1 an ComD2 binding, also align well with F13 residue in the proposed hydrophobic patch, suggesting that L13 residue also contributes to the binding of the cyclic peptides to ComD2 receptor. The addition of L13 residue as a new contributor to the receptor binding is likely to be attributed to the conformational change of the helix structure from the cyclization, which is an unexpected benefit of performing cyclization on CSP1. Since CSP1-cyc(K6D10) and CSP1-cyc(Orn6D10) are over 30-fold less potent than CSP1-cyc(Dab6E10) and CSP1-cyc (Dap6E10), we expected that their F7, F8, F11, I12 and L13 residues align poorly with the corresponding residues in CSP2-d10. Indeed, only the F8, F11 and L13 residues in CSP1-cyc(K6D10) align, though poorly, with L9, F11, and L13 in the CSP2-d10 hydrophobic patch, and only F11 and L13 in CSP1-cyc(Orn6D10) align, though poorly, with F11 and F13 in the CSP2-d10 hydrophobic patch. Together, the 2D-NMR analysis reaffirmed the validity of our previously hypothesized hydrophobic patches that are required for effective ComD1 and ComD2 binding, as well as confirmed that the conformation of the hydrophobic patch can be fine-tuned by changing the macrocycle ring size, thus fine-tuning the activity of the peptides.

CSP1-E1A-Cyc(Dap6E10) Showed Significantly Enhanced Proteolytic Stability.

The proteolytic stability of CSP1-E1A-cyc(Dap6E10) in Trypsin and Chymotrypsin solution was tested and the half-life measured. CSP1 and CSP1-E1AK6DapD10E were also tested in the same conditions for comparison (See FIG. 4E). All three peptides showed similar half-lives, suggesting that the cyclization does not improve the stability of the peptide. However, when analyzing the degradation products of CSP1 and CSP1-E1AK6DapD10E, products were identified that corresponded to the breaking of the amide bond between residues 3 and 4, 6 and 7, 9 and 10, as well as 15 and 16, while products that corresponded to the breaking of the amide bond between residues 3 and 4, as well as 15 and 16 were identified in CSP1-E1A-cyc(Dap6E10), indicating that the macrocycle region is protected from enzymatic degradation. Additionally, MALDI-TOF analysis indicated that after 4 hours, the majority of CSP1-E1A-cyc(Dap6E10) undergoes hydrolysis between residues 15 and 16, leading to the formation of CSP1-E1A-des-K16K17-cyc(Dap6E10). The previous study indicated that the K16 and K17 residues are dispensable and do not affect the activity of the peptide, indicating that CSP1-E1A-des-K16K17-cyc(Dap6E10) may still be a potent pan-group inhibitor. To test that, CSP1-E1A-des-K16K17-cyc(Dap6E10) was manually synthesized and evaluated its activity. Surprisingly, the truncated analogue exhibited almost 10-fold higher inhibition potency against the ComD1 receptor and 3-fold higher inhibition potency against the ComD2 receptor compared to the parent CSP1-E1A-cyc(Dap6E10). Together, the results indicate that the effective half-life of CSP1-E1A-cyc(Dap6E10) is significantly longer than 4 hours.

Example 2

This example demonstrates activity of dnCSPs against ComD1 and ComD2 receptors.

It is hypothesized that the release of pneumolysin (PLY) and proinflammatory cell wall components—both of which disrupt the air-blood barrier by the allolytic factors LytA, CbpD and CibAB—are involved in the pathogenesis of pneumococcal pneumonic sepsis. Erosion of the air-blood barrier allows pneumococcus to invade blood and cause sepsis, resulting in dysfunction of major organs. However, the importance of PLY in pneumococcal pathogenesis is not fully grasped. Differing mouse genetic backgrounds, route of infections and inoculum levels were believed to be major causes of discrepancies. For example, PLY-deficient mutants have varying degree of attenuation in C3H/HeOuJ, C3H/HeJ, BALB/c, 129/SvJ and C57BL/6J and CD1 mice. Also, PLY-deficient mutants inoculated through intranasal/intratracheal routes consistently had reduced capacity to penetrate from alveoli into lung interstitium, and to invade the bloodstream and cause sepsis. Another confounding variable is that the amount of PLY required to achieve maximal in vivo effect is small, which might have accounted for the apparent lack of correlation between PLY production and virulence in clinical isolates. However, most recent studies clearly demonstrate the importance of PLY in pneumonic sepsis that leads to pulmonary and cardiac damage. PLY rearranges cytoskeletal and disassembles vascular endothelial-cadherin at the tight junctions, as well as catalyzes myosin light chain (MLC) phosphorylation or inactivation of MLC phosphatase to induce cell contraction and endothelial barrier disruption. Furthermore, PLY activates the program cell death by elevating the cytosolic Ca2+ that leads to an alveolar capillary membrane dysfunction. PLY also impairs ENaC-mediated sodium uptake in type II alveolar epithelial cells. These events lead to the formation of permeability edema in lung, for which currently no effective treatment is available. Additionally, components of pneumococcal cell wall also participate in breaching the air-blood barrier. Phosphorylcholine facilitates translocation of pneumococcus through vascular endothelium and formation of cardiac microlesions by binding to the platelet activating factor receptor. Peptidoglycan, teichoic and lipoteichoic acids, and lipoproteins are proinflammatory, when leaked into the blood circulation, could enter the heart and reduce cardiac contractility, contributing to death. Moreover, persistent systemic inflammation could trigger acute coronary syndrome. Endothelial dysfunction, in combination with elevated levels of activated protein C, plasminogen activator inhibitor type-1 and changes in the antithrombin activity, could trigger a prothrombotic state that can lead to infarct. Furthermore, pneumonia reduces oxygenation and increases cardiac demand, placing considerable stress on the heart. Finally, matrix metalloproteinases and proinflammatory cytokines (TNFα, IL-1β, IL-6, IL-18) within the blood circulation cause vasoconstriction and myocardial depression.

Competence induction is a key step in the allolytic release of PLY. Unfortunately, little is known about how pneumococcus regulates the release of PLY and cell wall components that breach the air-blood barrier. In clinical settings, PLY is released by cell wall targeting antibiotics (e.g., β-lactams) or host-mediated killing (e.g., lysozyme). PLY is held within the cell wall by peptidoglycan branched stem peptides. PLY is released during normal growth (e.g., cell division) through "controlled, partial cell wall hydrolysis", or during complete autolysis at the late stationary phase. Importantly, both processes are dependent on the allolytic factors LytA, CbpD and CibAB, which we have recently shown to be regulated by the competence regulon.39 The competence regulon of pneumococcus is required for genetic transformation, and is centered on a quorum-sensing (QS) peptide called the competence stimulating peptide (CSP). There are two major CSP pherotypes that cover the vast majority of pneumococcal serotypes: CSP1 and CSP2 (Table 2 below). Each pneumococcal strain only expresses one pherotype. During growth, pneumococcal cells secrete and accumulate CSP to the environment (e.g., culture supernatant). When reaches threshold levels, CSP binds and activates the ComDE two-component regulatory system. Subsequently, the alternative sigma factor ComX, which binds to "combox"-containing promoters, is upregulated and initiates the transcription of ~80 "late" genes, of which, 16 are essential for genetic transformation. ComX in each pneumococcal strain is encoded by duplicated comX1 and comX2 genes, with identical function. We were the first to demonstrate the importance of the competence regulon in pneumococcal virulence. By deletion analysis, we have identified 14 "late" genes, disposable for genetic transformation, that are important for acute pneumonia and bacteremia/sepsis. Especially relevant, upregulation of allolytic factors LytA, CbpD, and CibAB by ComX is important for the development of pneumonic sepsis, through the release of PLY. In this Example, disclosed are the results of testing the hypothesis that upregulation of allolytic factors by ComX significantly enhances cell wall hydrolysis and PLY release, which erode air-blood barrier, allowing pneumococcus to invade and cause sepsis, resulting in immune dysfunction and pulmonary/cardiac damage.

TABLE 2

Activity of dnCSPs against ComD1 and ComD2 receptors using β-gal reporter. (IC50 values shown in italic font)

| Peptide Name | Sequence | ComD1 EC50/IC50 (95% CI) (nM) | ComD2 EC50/IC50 (95% CI) (nM) |
| --- | --- | --- | --- |
| CSP1 | E-M-R-L-S-K-F-F-R-D-F-I-L-Q-R-K-K (SEQ ID NO: 1) | 10.3 (6.27-16.8) | 526 (498-556) |
| CSP2 | E-M-R-I-S-R-I-I-L-D-F-L-F-L-R-K-K (SEQ ID NO: 2) | 1650 (1190-2300) | 50.7 (40.6-63.2) |
| CSP1-E1A | A-M-R-L-S-K-F-F-R-D-F-I-L-Q-R-K-K (SEQ ID NO: 3) | *85.7 (50.8-145)* | >10,000 |
| CSP1-K6A | E-M-R-L-S-A-F-F-R-D-F-I-L-Q-R-K-K (SEQ ID NO: 4) | 51.0 (37.9-68.6) | 24.0 (14.7-39.3) |
| CSP2-d10 | E-M-R-I-S-R-I-I-L-d-F-L-F-L-R-K-K (SEQ ID NO: 5) | 513 (437-602) | *2.86 (1.91-4.31)* |
| CSP2-E1Ad10 | A-M-R-I-S-R-I-I-L-d-F-L-F-L-R-K-K (SEQ ID NO: 6) | >1,000 | *56.5 (53.5-59.6)* |
| CSP1-E1Acyc(Dap6E10)* | A-M-R-L-S-(Dap-F-F-R-E)-F-I-L-Q-R-K-K (SEQ ID NO: 7) | *75.8 (49.9-115)** | *182 (132-251)** |

TABLE 2-continued

Activity of dnCSPs against ComD1 and ComD2 receptors using
β-gal reporter. (IC50 values shown in italic font)

| Peptide Name | Sequence | ComD1 EC50/IC50 (95% CI) (nM) | ComD2 EC50/IC50 (95% CI) (nM) |
|---|---|---|---|
| CSP1-E1A(DabE10) | A-M-R-L-S-(Dab-F-F-R-E)-F-I-L-Q-R-K-K (SEQ ID NO: 7) | *173 (136-221)* | *>1000* |
| CSP1-E1A-des-K16K17-cyc(Dap6E10) | A-M-R-L-S-(Dap-F-F-R-E)-F-I-L-Q-R (SEQ ID NO: 16) | *7.57 (3.60-15.9)* | *67.2 (42.0-107)* |

Fluoroquinolones and β-lactamase inhibitor commonly prescribed for CAP patients induce competence regulon. Fluoroquinolones, macrolides, β-lactams with or without β-lactamase inhibitor (e.g., clavulanate), or a cocktail of these drugs are widely prescribed to treat pneumococcal-mediated CAP. Modification of the antibiotic treatment is common due to therapeutic failure and resistance, especially with β-lactams. Common side effects of fluoroquinolones (e.g., moxifloxacin) and macrolides (e.g., erythromycin) include diarrhea, nausea, dizziness, and headache.

Severe side effects of fluoroquinolones and macrolides are rare, but include spontaneous tendon ruptures, nerve damage, and muscle weakness in patients with myasthenia gravis (quinolones), and allergic reaction and cholestatic hepatitis (macrolides, mostly erythromycin). Clavulanate with penicillins are associated with an increased incidence of cholestatic jaundice and acute hepatitis. The relative efficacy and safety of macrolides verses quinolones in the treatment of CAP were systematic reviewed, and meta-analysis of 16 randomized controlled trials between macrolides and quinolones for the treatment of adult CAP patients suggest no difference in all-cause mortality. However, macrolides were associated with more adverse events, mainly gastrointestinal. Studies on 4th-generation fluoroquinolones (e.g., moxifloxacin, levofloxacin) and data on β-lactamase inhibitor clavulanate show that these antibacterials could activate the pneumococcal competence.

Synthetic dominant-negative variants of CSP (dnCSPs) inhibit the induction of competence regulon. In an effort to identify therapeutic strategies to inhibit competence-mediated allolysis, chemical synthesis was used to mutagenize CSP1 and CSP2 (Table 2). Significantly, both phenotype-specific dnCSPs (CSP1-E1A and CSP2-E1Ad10) were identified, and most recently a pan-group dnCSP (CSP1-E1Acyc (Dap6E10)) (Table 3) that effectively inhibit the activation of ComX, expression of LytA and CbpD, and allolytic release of PLY in dose and time dependent manners, as well as attenuate acute pneumonia. Moreover, CSP1-E1A attenuates the acquisition of an antibiotic resistance gene and a capsule gene required for virulence in mouse models of bacteremia and pneumonia infections. Additionally, it is contemplated that modified *Staphylococcus aureus* QS peptides could inhibit virulence induction and kill the bacteria. It is also contemplated that dnCSPs could be used against pneumonic sepsis; and inclusion of dnCSPs could augment the efficacy of antibacterials against pneumococcal pneumonic sepsis.

The disclosed approach is innovative for at least the following reasons: (1) Innovation in dnCSP development: The conventional method of developing dnCSPs is by mono-amino acid substitutions. The disclosed approach represents substantial departure from the status quo by employing a global peptide modification in the form of peptide cyclization to induce the desired bioactive conformation that leads to highly potent and metabolicallystable dnCSPs. (2) Novel therapeutics against pneumococcal diseases: The use of dnCSPs as adjunctive therapy is new, and effectively attenuates the disruption of air-blood barrier, pneumonic sepsis, and dysfunction of major organs (e.g., lung, heart). (3) dnCSPs offer multi-benefits: dnCSPs, especially cyclic pan-dnCSPs are broad spectrum and cover all pneumococcal serotypes (Table 2). Moreover, inhibition of the competence regulon will attenuate both pneumococcal infection and spread of antibiotic resistance and virulence genes. (4) dnCSPs will suppress the induction of competence regulon by antibacterials: Activation of the competence regulon by fluoroquinolones and clavulanate may exacerbate the release of PLY and cell wall components that disrupt air-blood barrier. Thus, inclusion of dnCSPs will augment the efficacy of these antibacterials against pneumococcal sepsis. (5) Changing the status quo as it pertains to the treatment of pneumococcal sepsis: There is a consistent increase in vaccine-escape, multidrug resistant lineages of pneumococcus. The disclosed approach represents a substantial departure from the status quo by targeting a non-essential QS pathway to attenuate pneumococcal pathogenicity without subjecting the bacteria to selective pressure for resistance development. This approach opens new QS research avenues in intra- and inter-species communication of Gram-positive pathogens.

Results

ComX-deficient mutant is attenuated in mouse models of acute pneumonia and bacteremia. ComX, the master regulator of competence regulon, is encoded by two identical, functionally-redundant genes—comX1 and comX2. ComX initiates the expression of effectors for DNA uptake, processing, integration, as well as allolytic factors LytA, CbpD and CibAB. To determine if ComX plays a virulence role during host infection, ΔcomX1, ΔcomX2 and ΔcomX1ΔcomX2 mutants were analyzed in direct competitive infection against the invasive serotype 2 parental wild-type D39, as well as in single acute pneumonia and bacteremia infections. Importantly, ΔcomX1ΔcomX2 was only 20 and 23% as competitive against D39 during acute pneumonia and bacteremia, respectively, and was attenuated in single acute pneumonia and bacteremia infection [FIG. 5A-5D].

LytA, CbpD and CibAB are competence phase-specific virulence factors. The role of ComX-regulated "late" genes in pneumonia and bacteremia infection were determined. Comprehensive gene deletion analyses and virulence studies revealed that, among the virulence factors encoded by the 14

"late" genes, DprA, LytA, CbpD and CibAB are specifically-required during the competent phase. DprA regulates physiological exit from the competence state. The importance of LytA, CbpD and CibAB in virulence is shown by single infections [FIGS. 6A-6B]. In particular, the triple-deleted ΔcbpDΔcibABΔlytA mutant is 2.4 log and 2.8 log attenuated in pneumonia and bacteremia, respectively.

Figure 7A:
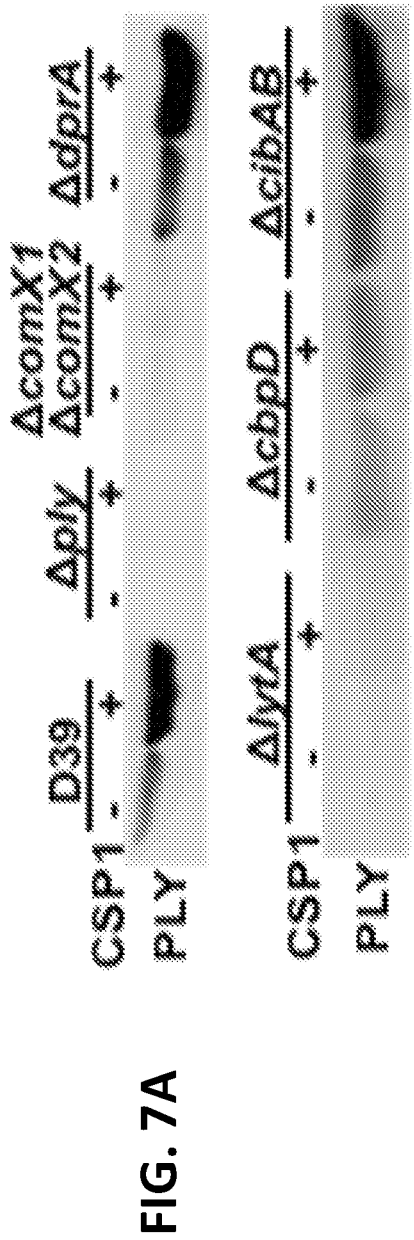
FIGS. 7A-7B. Competence-dependent virulence is due to the release of PLY. PLY release and associated hemolytic activities in the presence or absence of CSP1 in indicated pneumococcal strains. Experiments were performed in triplicates, and independently 3 times. Mean±std dev from one representative experiment are shown. * $p<0.05$ by using the GRAPHPAD Prism graphing software.
Figure 7B:
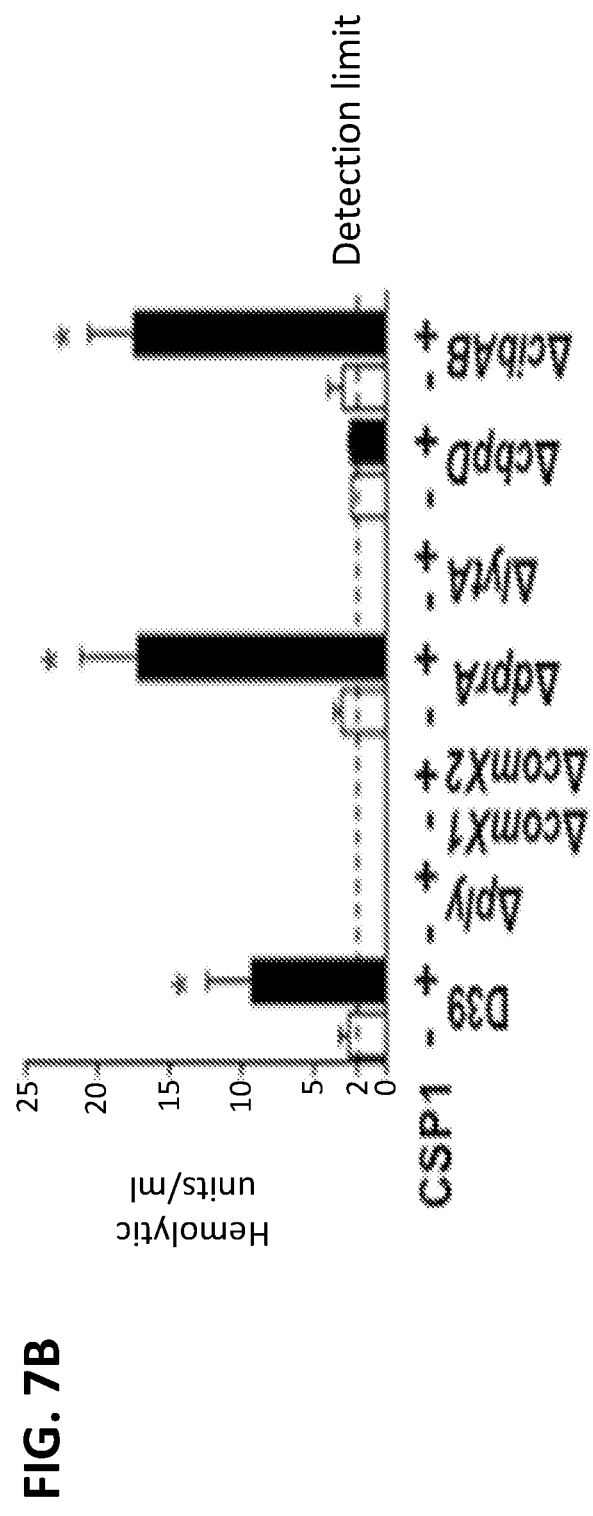

Competence-dependent virulence is partially due to PLY release. The importance of competence-mediated allolysis in the release of PLY was evaluated. Δply mutant did not express PLY [FIG. 7A]. Competence induction by CSP1 substantially increased the release of PLY in D39 by 3-fold. Significantly, CSP1 was unable to induce PLY release in ΔcomX1ΔcomX2, ΔlytA and ΔcbpD. In contrast, CSP1 increased PLY release by 2.3-fold in ΔcibAB and ΔdprA. These results indicate that induction of ComX increases the release of PLY by upregulating primarily LytA and CbpD, and much less, CibAB. The extent of hemolysis by culture supernatant mirrored the extent of PLY release, with the reduction in both ΔcomX1ΔcomX2 and ΔlytA comparable to Δply (FIG. 7B).

Figures 7C, 7D:
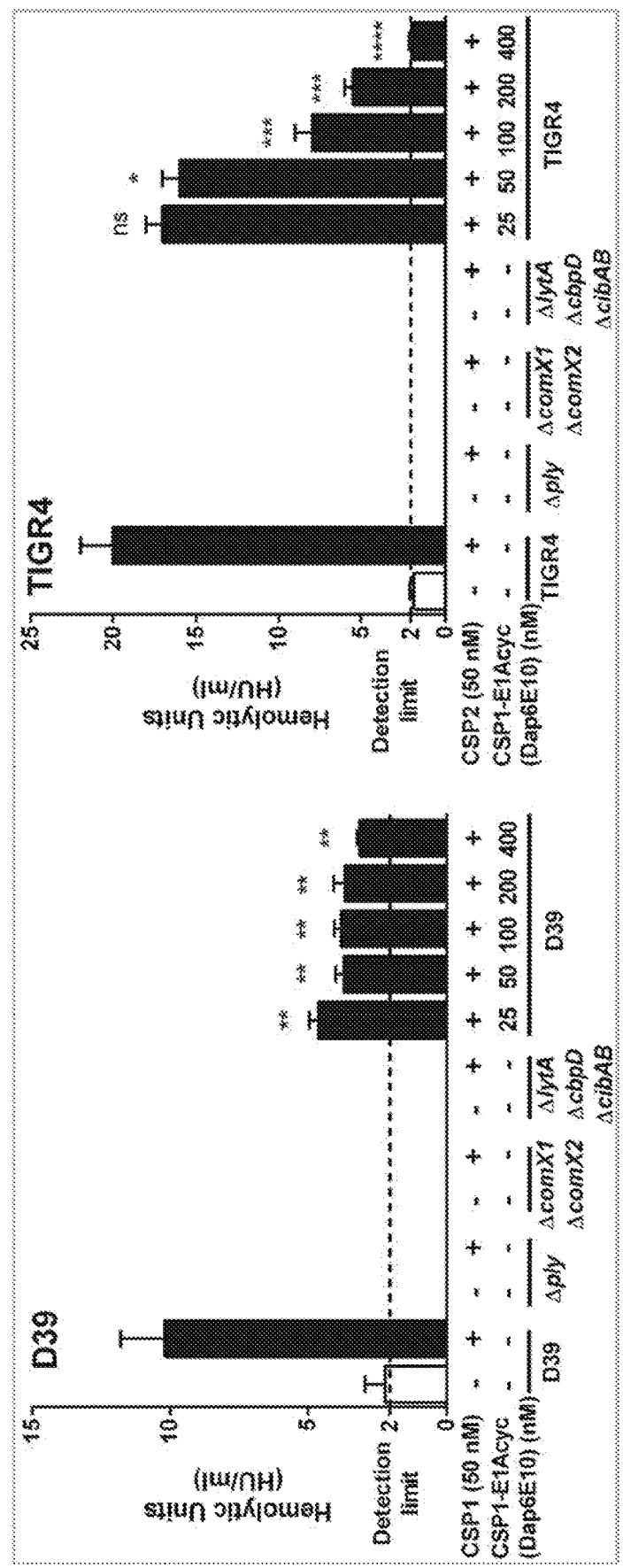
FIGS. 7C-7D. CSP1-E1A-cyc(Dap6E10) competitively inhibits hemolysis induced by CSPs.

The efficacy of CSP1-E1A-cyc(Dap6E10) to cross inhibit pneumolysin-mediated hemolysis of sheep blood (Hemostat Laboratories #DSB250) induced by CSP1 in the group 1 strain D39 and by CSP2 in the group 2 strain TIGR4 was examined. The pneumolysin deficient mutant Δply, as well as ComX-deficient mutant ΔcomX1ΔcomX2 and the allolysis-deficient mutant ΔlytAΔcbpDΔcibAB did not express pneumolysin and did not cause measurable levels of hemolysis (FIGS. 7C-7D). In contrast, provision of CSP1 to D39 and CSP2 to TIGR induced significant levels of hemolysis. Significantly, CSP1-E1A-cyc(Dap6E10) attenuated pneumolysin release and effectively reduced the hemolysis of sheep blood in both D39 and TIGR4 exposed to CSP1 and CSP2, respectively (FIGS. 7C-7D), demonstrating its pan-inhibitory capability. CSP1-E1A-cyc (Dap6E10) was 3-4 fold more effective in inhibiting hemolysis mediated by D39 than TIGR4, in agreement with its IC50 values against both strains. Collectively, these results suggest that CSP1-E1A-cyc(Dap6E10) could be efficacious in attenuating pneumococcus virulence during host infection.

Figure 8:
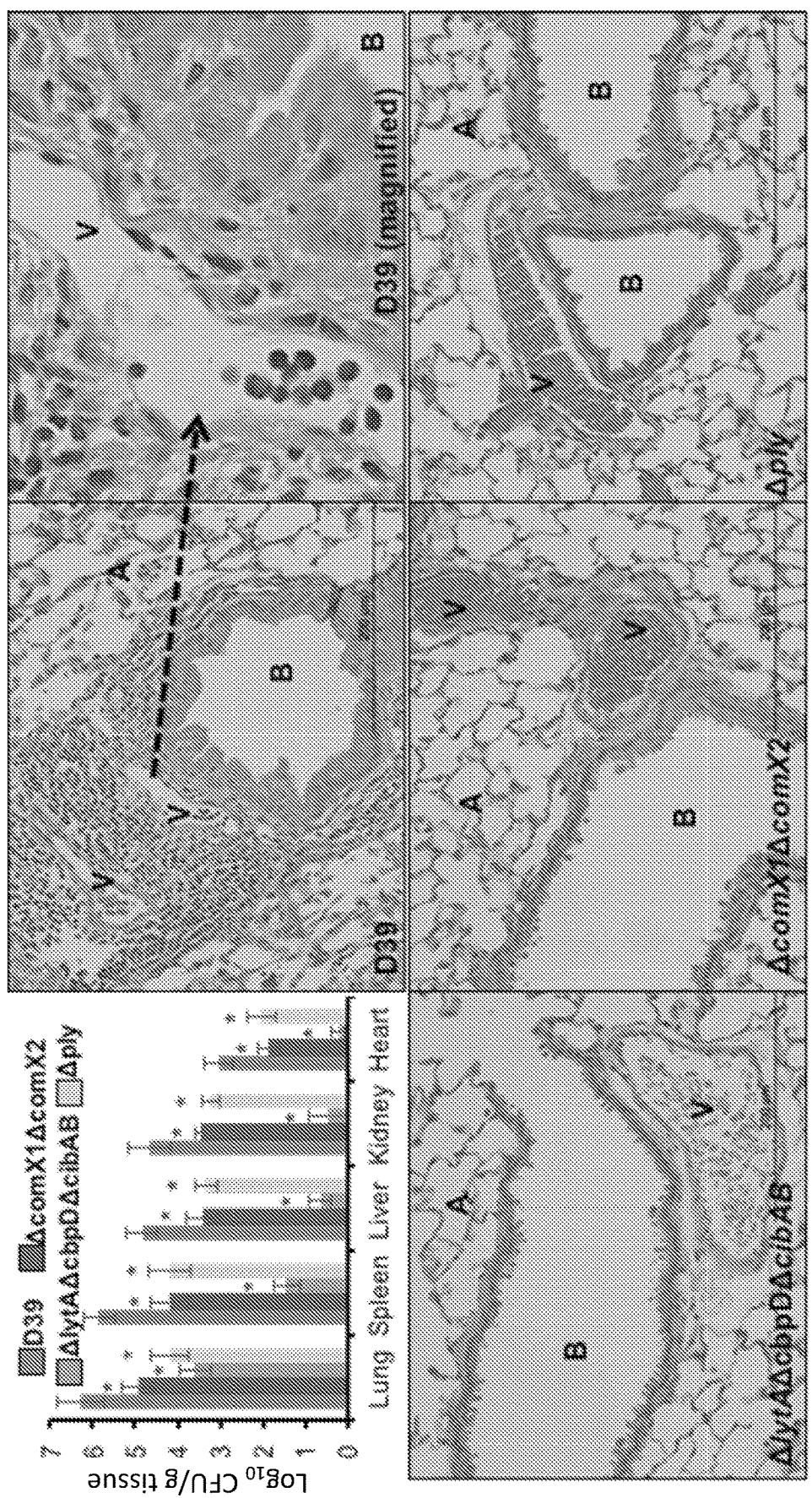
FIG. 8. ΔlytAΔcbpDΔcibAB mutant is attenuated in breaching air-blood barrier during pneumonic sepsis. CD1 mice (n=6, males & females) were intranasally-infected with $5\times10^{06}$ CFU of pneumococcal strains for 48 hours. Left top panel: Bacterial burden analyses indicate that the ΔlytAΔcbpDΔcibAB mutant is severely attenuated in its ability to invade bloodstream and systemic spread to other organs. Right top and bottom panels: Histopathological analysis of mouse lungs by H&E stain. Peribronchial, perivascular, & alveolar inflammation, alveolar-capillary disruption (D39 magnified) and hemorrhage were observed in mice infected with D39 but not with ΔcomX1ΔcomX2, ΔlytAΔcbpDΔcibAB and Δply (n=4). B=bronchioles, V=blood vessels, A=alveoli. * $p<0.05$ when compared against D39 by using the GRAPHPAD Prism graphing software.

ΔlytAΔcbpDΔcibAB mutant is attenuated in breaching the air-blood barrier and systemic spread to other organs. The ability of ΔcomX1ΔcomX2 and ΔlytAΔcbpDΔcibAB were compared against Δply in their ability to disrupt air-blood barrier and spread systemically to other organs in mouse model of acute pneumonia-derived sepsis. D39 caused severe disruption of air-blood barrier, resulted in systemic spread to spleen, kidney, liver and heart (FIG. 8). In contrast, ΔcomX1ΔcomX2 was as attenuated as Δply in its ability to cause lung infection, disrupt air-blood barrier and spread systemically. Significantly, ΔlytAΔcbpDΔcibAB was more attenuated than ΔcomX1ΔcomX2 and Δply in pneumonia, disruption of air-blood barrier, with severely reduced ability to systemically spread to major organs [FIG. 8]. These results indicate that competence-mediated allolysis plays crucial roles in breaching the air-blood barrier, allowing pneumococcus to invade and cause pneumonic sepsis.

dnCSPs potently inhibits ComX-regulated LytA and CbpD. Based on chemical biology synthesis methods, both the Lau and Co-PI Tal-Gan labs have identified CSP1 and CSP2 analogs that are capable of inhibiting the induction of ComX (Table 2). We found that substitution of Glu1 to alanine (CSP1-E1A) generates an analog that not only losses the ability to induce ComX, but also functions in a dominant-negative manner, by competitively inhibiting the ability of CSP1 to induce ComX, genetic transformation and the expression of ComX, CbpD and LytA induced by CSP1 (FIGS. 9A-9C). Similarly, a combined replacement of Glu1 to alanine and Asp10 with its D-enantiomer on CSP2 generates a potent dnCSP (CSP2-E1Ad10) capable of inhibiting ComX induction by CSP2. Finally, we have generated a cyclic pan-dnCSP CSP1-E1Acyc(Dap6E10) that efficiently inhibits both CSP1 and CSP2-mediated ComX induction (FIGS. 9D-9E).

dnCSPs potently inhibit PLY release and attenuate mouse mortality during acute pneumonia. Co-administration of CSP1-E1A and CSP2-E1Ad10 inhibit the transfer of both antibiotic resistance and virulence genes during acute pneumonia and bacteremia infection, and attenuate PLY release and blood hemolysis induced by wild-type CSPs in culture supernatant of D39 and TIGR4.64,83 SIMILARLY, CSP1-E1Acyc(Dap6E10) could attenuate PLY release and subsequent blood hemolysis by both D39 and TIGR4 (FIGS. 10A-10B). Significantly, in a model of acute pneumonia, CSP1-E1A,39 CSP2-E1Ad10,83 and CSP1-E1Acyc(Dap6E10) (FIG. 10C) significantly reduced mouse mortality and delayed the kinetics of death by wild-type pneumococcal strains D39 and TIGR4. Collectively, these data demonstrate that dnCSPs protect against disruption of air-blood barrier and pneumonic sepsis mediated by ComX-regulated allolytic release of PLY.

dnCSPs potently inhibit the induction of ComX by moxifloxacin and clavulanic acid. Among the "late" genes activated by ComX, ssbB, which encodes a single strand DNA binding protein, is the most highly induced. A luminescence-based reporter system more sensitive than the lacZ reporter (FIGS. 9D-9E) was constructed by transcriptionally fusing the luxABCDE genes behind the promoter of ssbB and cloned in the plasmid pEVP363 (FIG. 11A). Intriguingly, all 3 dnCSPs inhibited the transcriptional activities of ComX induced by CSP1 and CSP2, as well as by subinhibitory concentrations of moxifloxacin and clavulanate (FIGS. 11B-11E), in a concentration dependent manner.

Research Design and Methods.

Pulmonary function measurement. The relative retention of normal lung function is determined by measuring lung compliance and resistance with a computer-controlled small animal ventilator (Flexivent, SCIREQ), and pleural effusion and empyema of infected mouse lungs by CT scan at the fully-staffed UIUC Small Animal Clinics.

Measurement of heart function by surface echocardiography (echo) and surface electrocardiography (ECG). Assessment of heart function will be performed by Co-I Dr. Fries, a board-certified veterinary cardiologist. echo: mice will be anesthetized isoflurane maintained at 1.5-2%, delivered by nosecone. Then, two-dimensional M-mode and B-mode echocardiography (GE, Vivid E9 with XDclear) will be used to detect the left ventricular end-systolic diameter (LVEDs), left ventricular end-diastolic diameter (LVEDd), left ventricular ejection fraction (EF), and left ventricular fractional shortening (FS). FS % will be calculated from the following equation:

$$FS\% = [(LVEDd-LVEDs)/LVEDd] \times 100.$$

Additionally, 2D echoes will be obtained and speckle tracking analysis (AFI, EchoPAC) will be performed to measure myocardial strain. ECG: Electrocardiograms will be obtained with a Fukuda Denshi ECG unit (FD 16 Model) under Ketamine anesthesia (10 mg/kg). The electrocardiographic tracings will be obtained with six standard leads (bipolar leads DI, DII, DIII and unipolar leads aVR, aVL, aVF), recording at 50 mm/s with amplitude set to give 1 mV/10 mm. ECG parameters evaluated will be: heart rate (beats per minute), modifications in atrioventricular conduction (prolonged PR segment) and ventricular conduction (prolonged QT interval) in milliseconds. The heart function will be considered altered when one or more of the following are present: increased or decreased heart rate (control values for comparison: 555.54±13.99), prolonged PR segment (control: 0.0247±0.0009) and prolonged QT interval (control: 0.0298±0.0008).

Figure 13:
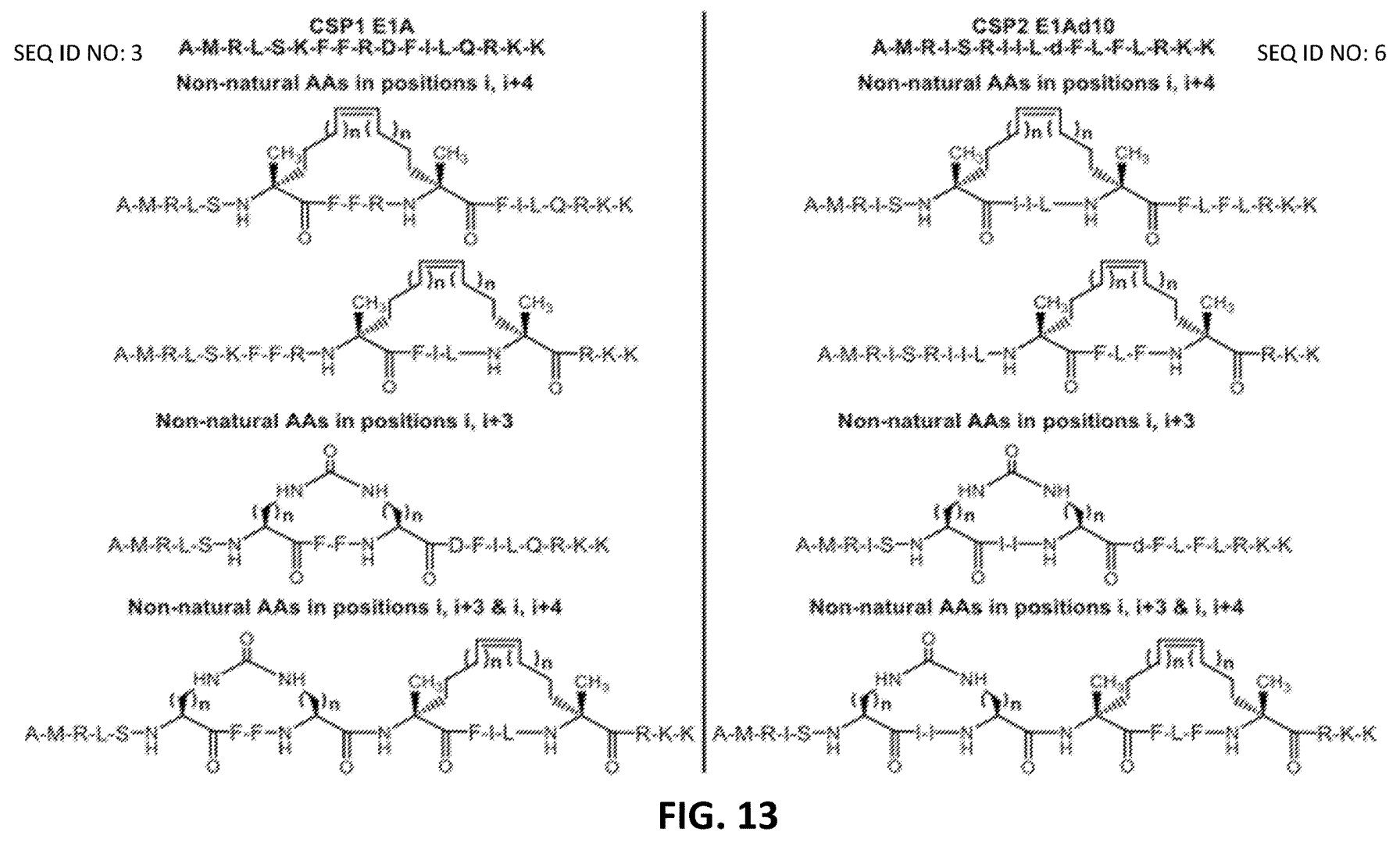

To Synthesize the Next Generation dnCSPs and Determine the Molecular Basis of Competence Inhibition Construction of cyclic dnCSPs. Lactam cyclization of the CSP1 scaffold stabilizes the bioactive helix conformation, leading to a pan-group dnCSP, CSP1-E1Acyc(Dap6E10) (Table 2). Based on these results, a library of constraint cyclic peptide analogs is constructed to induce and stabilize helicity of the two lead dnCSP sequences (CSP1-E1A and CSP2-E1Ad10 Table 2). Helical stabilization can be achieved by incorporating anchors at i, i+4 positions (for metathesis cyclization) or i, i+3 positions (for urea cyclization). K6, R9, D10, and Q14 for CSP1 and R6, L9, D10, and L14 for CSP2—could be altered to incorporate tethers for peptide cyclization. These positions are used to construct libraries of dnCSPs and conduct both sequence and conformation optimization. To this end, a combinatorial approach will be applied to both lead dnCSPs where the non-essential residues will be replaced to afford different cyclic peptide scaffolds [FIG. 13]. Then, a conformational screen will be conducted to each peptide scaffold by incorporating tethers of varying lengths to affect the ring size and fine-tune the 3D conformation. The cyclic peptides will be synthesized using non-natural amino acids that will be incorporated in either i, i+4 positions for metathesis cyclization, 96 or at i+3 positions for urea cyclization. Optimization of the bioactive conformation will be performed by changing the ring size (through different n values). These peptides will be evaluated for their biological activity as well as their 3D structures, respectively. Overall, we have designed 4 scaffolds for each lead dnCSP [FIG. 13], and will produce 16 cyclic analogs to each scaffold (to a total of 128 cyclic peptides). All the cyclic dnCSPs will be synthesized using standard Fmoc-based solid phase peptide synthesis (SPPS) protocols, purified to homogeneity (>95%) using reversed-phase HPLC, and verified with mass spectrometry.

Figure 15:
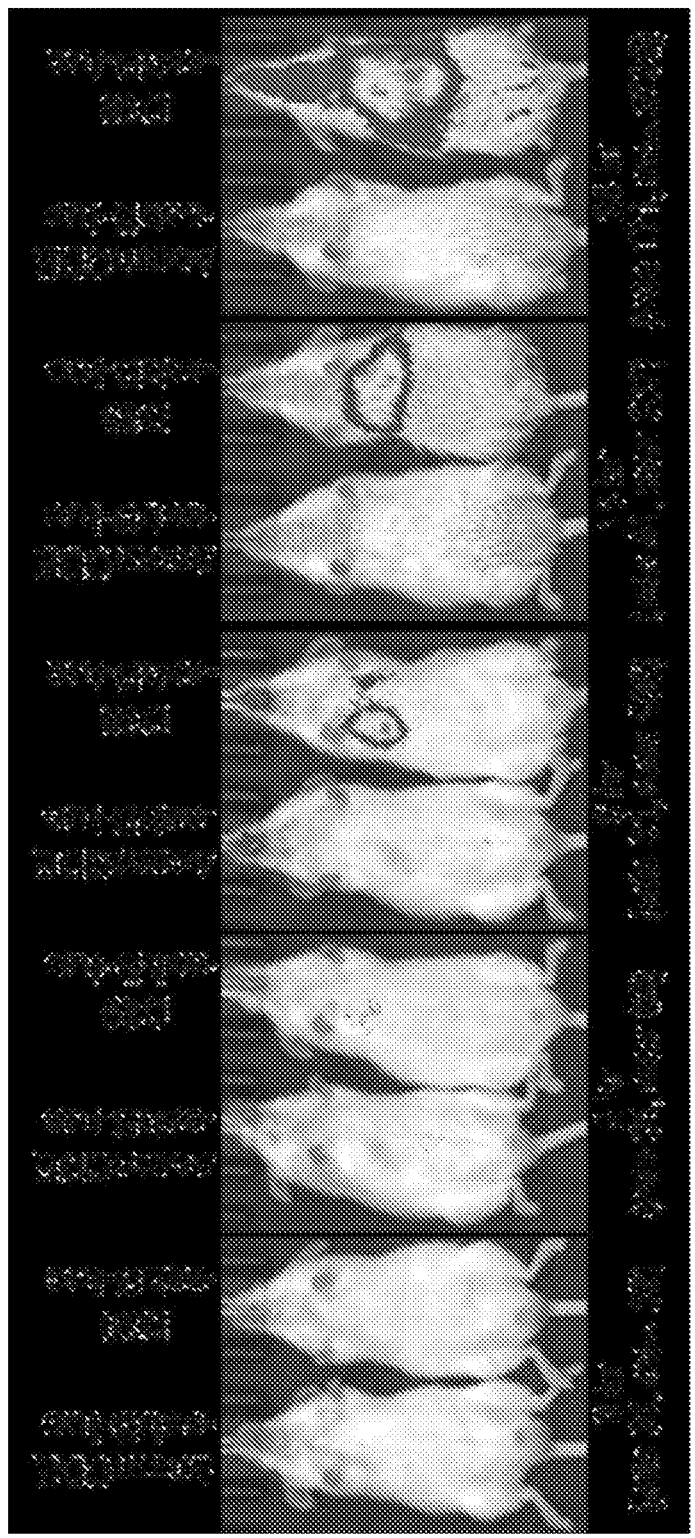
FIG. 15. Live imaging of competence induction. CD1 mice (n=4) were infected with D39-ssbB-luc or ΔcomCDEssbB-luc. Mice were housed pairwise and tracked for competence induction and transmission. Mice were injected with 2 mg luciferin prior to imaging with an IVIS Spectrum CT 3D Optical Imaging System. The low transient signal in ΔcomCDE-ssbB-luc mouse (6-hr) was likely due to transmission from D39-ssbB-luc-infected mouse housed in the same cage.

Biological evaluation of cyclic dnCSPs. The cyclic dnCSPs will be assessed for inhibition of competence induction using the β-gal, lux (FIG. 11) or luc (FIG. 15) reporter systems we have optimized for the analysis of a large number of signal variants in 96-well plates. All assays will be performed in triplicates and independently three times. Serial dilutions of dnCSPs will be conducted to determine the EC50 and IC50 values of promising dnCSPs through initial screening. Data from reporter assays will be analyzed using the GraphPad Prism software. The lead dnCSPs will be assessed for their therapeutic potential using multiple in vitro assays, including attenuation of ComX-induction (reporter systems), genetic transformation, allolysis (zymogram assays), and release of PLY (hemolysis & Western blots). Lastly, the pneumococcal competence system regulates biofilm formation, which is important for the pathogenesis of cardiac dysfunction. The ability of the dnCSPs to inhibit biofilm formation will be evaluated after 24 hr of growth on 1% BSA coated coverslips placed in flat-bottom polystyrene tissue culture plates by staining with FilmTracer LIVE/DEAD Biofilm viability kit (Invitrogen, L10316), and visualized using a confocal microscope and Z-stacked to construct 3D-images.

Figures 12A, 12B:
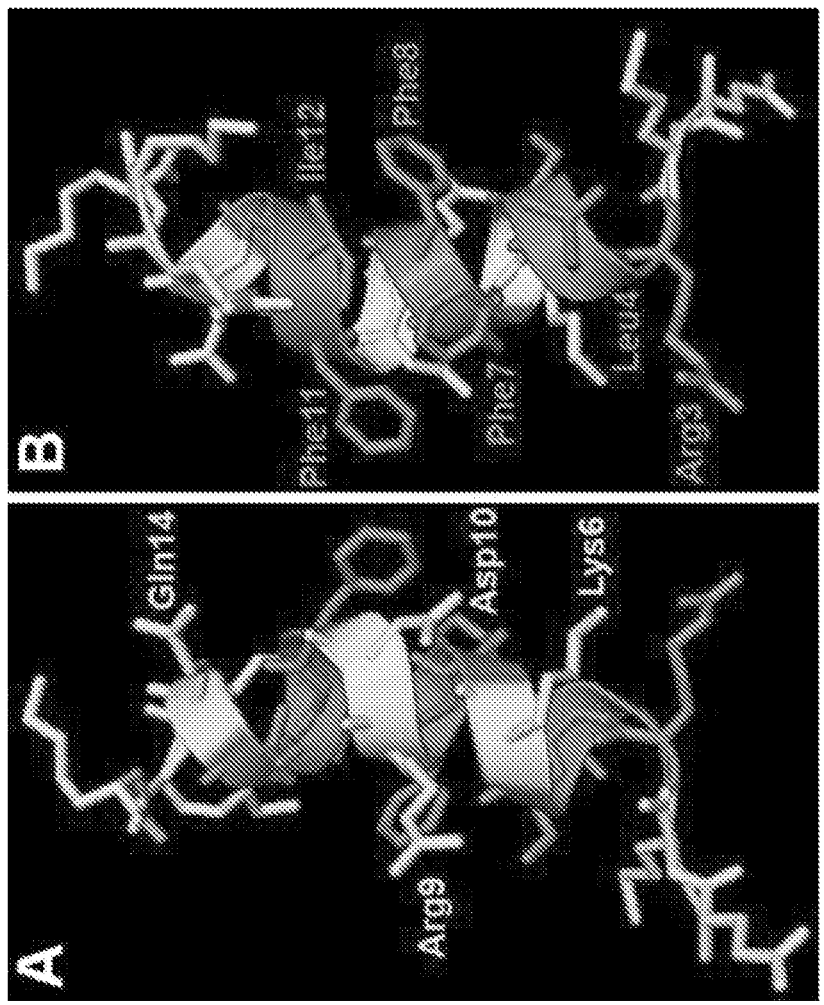
FIGS. 12A-12B. 3D structure of CSP1 in membrane mimicking condition. CSP1 adopts an amphiphilic α-helix conformation spanning from Arg3 to Lys16. Green represents dispensable residues, while red represents essential residues.

Define the bioactive conformation of lead cyclic dnCSPs. Detailed evaluation of 19 lead cyclic dnCSPs: 6 selective dnCSPs for each ComD receptor, and 7 pan-group dnCSPs. This analysis will enable one to delineate the structural motifs required for receptor binding and activation. These dnCSP analogs will be evaluated for their detailed 3D structure using solution-phase structural NMR techniques, where they will be processed on a 900 MHz spectrometer, and conduct correlation spectroscopy (COSY), total correlation spectroscopy (TOCSY), Nuclear Overhauser effect spectroscopy (NOESY), HC-HSQC and HN-HSQC experiments, followed by proton assignment to construct distance and angle restraints for structural calculations (FIG. 12).

Pharmacological evaluation of lead cyclic dnCSPs. Before moving the most promising dnCSPs into mouse models, their pharmacological properties will be evaluated. As these are peptide-based drugs, first assessed are their metabolic stability. These assays will include prolonged incubation in physiologically-relevant buffers with varying pH values, stability towards degradation by trypsin and chymotrypsin, and stability in mouse lungs, plasma and serum to simulate in vivo proteolytic environments. Degradation of dnCSPs will be quantified using HPLC. CSP1-E1A degrades rapidly (half-life of 1.5 hours), while the incorporation of a D-amino acid in CSP2-E1Ad10 led to an increased half-life (>3 hours) (FIG. 14A) in vitro, and in mouse lungs ((FIG. 14B). Peptides with favorable proteolytic profiles will be evaluated for their toxicity towards primary alveolar epithelial cells (ScienCell Research Lab #3200) and immortalized alveolar type II-like A549 cells, by measuring the release of lactate dehydrogenase. Cell viability will be determined by MTT assays. Also, dnCSPs will be assessed for hemolysis of red blood cells. To determine the maximum tolerated dose (MTD), mice (n=8) will receive daily doses ranging from 200 μg-20 mg/kg of equivalents, by successively challenging the animals from lowest dosage to upper limits. The MTD will be defined as the maximum dose that causes a 15% loss of initial weight. Therapeutic dosage will be set at below the MTD that do not cause weight loss when compared to mock. Systemic toxicity will be assessed by performing blood chemistry and complete blood count (CBC) with differential. Major organs (e.g., liver, kidney, heart, lung, etc.) and sternum (to test genotoxicity) will be collected for histopathological and toxicological analysis. The most promising dnCSPs with good acute toxicity and pharmacokinetic profiles will be further tested for chronic toxicity (at therapeutic doses, for 10% of mouse lifespan duration) to achieve the Good Manufacturing Practice (GMP) quality therapeutics. Importantly, MTD studies revealed neither clinical evidence for myelosuppression, renal injury, hepatic toxicity nor other abnormalities (FIG. 14C-14D) in mice exposed to both native and dnCSPs, supporting previous finding that they are nontoxic.

To determine the role of ComX-regulated allolysis in disruption of air-blood barrier, sepsis, and lung and cardiac dysfunctions in mice. Rationale and hypothesis: Vascular endothelial cell lysis and proinflammatory activities caused by PLY and cell wall components are important in the breaching of air-blood barrier, resulting in sepsis. Despite antibiotic treatments, morbidity and mortality rate in CAP and resulting pneumonic sepsis remain high. Apart from live bacteria, additional factors, include both dysregulated host response to infection and injury, and inability to restore homeostasis, resulting in immune dysfunction (anergy) during sepsis. The hypothesis that ComX-regulated allolysis significantly disrupts air-blood barrier, allowing pneumococcus to invade and cause sepsis, leading to immune dysregulation, lung and cardiac dysfunctions will be tested.

Determine the importance of competence-mediated allolysis in air-blood barrier disruption, pneumococcal invasion, and pulmonary and cardiac dysfunction. Pneumococcal infection. ΔcomX1ΔcomX2, ΔlytAΔcbpDΔcibAB and Δply are severely attenuated in their ability to disrupt air-blood barrier, with reduced systemic spread to other organs (FIGS. 5A-8). To characterize the importance of ComX-driven allolysis during pneumonic sepsis, the disruption of the air-blood barrier and the resulting pneumococcal escape from the lung into blood by wild-type strains D39 and TIGR4 verses their respective derivatives ΔcomX1ΔcomX2 and ΔlytAΔcbpDΔcibAB during naturally developed competence, which occur during colonization and infection in mice [see FIG. 15] and humans will be evaluated. Briefly, 6-week old CD1 mice (cohorts of 8, equal ratio of both sexes) will be intratracheally-infected with the pneumococcal strains ($5 \times 10^6$ CFU). At Time 0 (basal levels), 48 and 96-hours post-infection, mice will be analyzed for pathological changes associated with air-blood barrier disruption, sepsis, lung and heart dysfunction: (1) Mouse urine (n=8) will be captured, and the amount of PLY, lipoteichoid acids and capsular polysaccharide in the urine will be analyzed by ELISA. (2) After urine collection, cardiac and lung functions of mice (n=8) will be examined using echo and ECG, followed by determination of the pleural effusion and empyema by CT scan, and lung function by Flexivent. (3) After lung/heart function determination, left lobe of mouse lungs will be bronchoalveolar lavaged (BAL). BAL fluid (BALF) will be used to measure leakage of serum albumin into lungs as a marker of the compromised air-blood barrier. (4) Bacteria in the blood will be quantified by serial dilution plating. (5) The expression of comX1, lytA, cbpD and ply genes in the BALF, homogenized left lobe of infected lungs and in blood will be determined by qPCR using probes and primers (Applied Biosystems). We use qPCR to examine bacterial and host gene expression.

Determine the molecular and cellular signatures of pulmonary and cardiac damage. After echo/ECG/Flexivent, all the hearts and right lobes of lungs of mice (n=8) will be processed for histopathological analyses: (1) The integrity of tight junction at air-blood barrier will be determined by staining lung sections with H&E [FIG. 8], and immunohistochemically (IHC) with antibodies against ZO-1, Claudin 1 and cadherin127 (Santa Cruz Biotech sc-10804, sc-22932, sc-9989). (2) Invasion of myocardium and presence of pneumococcal microlesions will be imaged by confocal microscopy with anti-pneumococcal antibodies (Abcam #ab126795) and transmission electron microscopy. (3) Biofilm formation within cardiac microlesions will be visualized by staining heart sections (n>5) for the presence of extracellular matrix components including nucleic acids (DAPI), capsule (anti-capsule antibody), and mouse extracellular DNA (anti-mH2A histone antibody). (4) Circulating markers of sepsis (e.g., CRT, PCT, Ang-1, Ang-2, endocans) will be determined by ELISA (R&DSystems). (5) Circulating markers of cardiac damage will be analyzed by the cardiac enzyme test (blood levels of creatine phosphokinase (CPK), and by measuring myoglobin and troponins (cTnI or cTnT) by ELISA. (6) Proinflammatory cytokines TNF-α, IL-1β, IL-6, IL-18, matrix metalloproteinases, and DAMPs HMGB1128 and S100, which cause vasoconstriction and myocardial depression, will be measured by ELISA. Data from 1-6 above will be correlated with the levels of bacteria, PLY and lipoteichoic acids in mouse sera. Sera from uninfected mice will serve as controls. Time permitting, the plasma from the infected mice will be tested for its impact on the function of (1) ENaC, and (2) cardiomyocyte contractility. ENaC function will be determined in primary type II alveolar epithelial cells cultured on a Transwell membrane by measuring short circuit current in Ussing chambers. To determine cardiomyocyte contractibility, primary human cardiomyocytes (Creative Bioarray #CSC-C2847) will be placed in a chamber on a Diaphot-TMD inverted microscope, and stimulate electrically by bipolar pulses (5-ms duration, 0.1-10 Hz, 37° C.) using platinum electrodes on either side of the chamber. Results will reveal that ComX-mediated allolysis significantly erodes air-blood barrier, resulting in pneumonic sepsis, and lung and cardiac dysfunction.

Determine the innate immune dysfunction sequelae of pneumonic sepsis. Pneumococcal pneumonic sepsis causes multi-organ disfunction. However, it is unclear if pulmonary and cardiac dysfunctions are solely caused by pneumococcal invasion and PLY/cell wall toxicity, as opposed to some host's factors. Dysregulation of host immune response can also contribute to multi-organ dysfunction. Neutrophils are critical for clearance of pathogens, but excessive response is deleterious. In septic patients, neutrophil response is dysregulated, with exuberant initial inflammation, followed by a profound state suppression, including inhibition of recruitment. Inflammasomes (e.g., NLRC4, NLRP6) and inflammatory chemokines (e.g., CXCL1, CXCL2, CXCL5, ligand of CXCR2) ae involved in neutrophil recruitment and function during pneumonic sepsis mediated by *S. aureus, K. pneumoniae* and polymicrobial. Neutrophils are involved in pneumococcus clearance. During acute pneumococcal pneumonia, there is a massive neutrophil influx into the lung [FIG. 8]. The PLY released by the pneumococcus is recognized by TLR4, which induces production of chemokines (CCL, CXCL), TNF-α, IL-6 and IL-8 that drive neutrophil recruitment. However, mechanism governing neutrophil responses is poorly studied in pneumococcal sepsis. Therefore, one goal is to dissect molecular signatures of neutrophil dysfunction and its sequelae on lung/heart during pneumonic sepsis. The roles of CXCL1, CXCL2 and CXCL5 in pneumonic sepsis will be determined by measuring the level of these chemokines by ELISA in BALF and serum. Various immune cell populations (epithelial cells, CD326; various myeloid cells, CD11b, Ly6C, Ly6G) are isolated by flow cytometry to determine which are producing CXCL chemokines. Neutrophil dysfunction (aberration in ROS production, activation markers CD11a and CD44 expression, NADPH oxidase activities, etc) will be analyzed using a flow cytometer. If the level of CXCL chemokines is altered, one will first examine Cxcl1−/− homozygous mice (Cxcl1tm1Wabo, Jackson Laboratory) and infect them with $5 \times 10^6$ CFU of D39 and ΔlytAΔcbpDΔcibAB, and compare them against wild-type C57BL6/J (8/cohort, equal sexes). Mice infected with the Δply will be used as control. To authenticate the importance of CXCL1, C57BL6 mice (n=8) will be treated with anti-CXCL1 mAb (250 μg, intraperitoneal, clone 48415, ThermoFisher Scientific) vs. irrelevant rat IgG at 48, 24, and 2 hours prior to infection. At Time 0, 48 and 96-hours post-infection, mouse mortality, neutrophils counts (CD11b+Ly6G+ in bone marrow, blood, and lungs), CXCL1/CXCL2/CXCL5 expression, bacterial burden (in lung & blood), and various lung and cardiac dysfunction parameters, will be compared. Because CXCL1, CXCL2 and CXCL5 are all ligands of CXCR2, with some functional overlap, it will be determined if provision of recombinant CXCL2 and CXCL5 could rescue neutrophil dysfunction in Cxcl1−/−mice.

To Determine the Efficacy of dnCSPs in Inhibiting Competence-Mediated Pneumonic Sepsis and Pulmonary and Cardiac Dysfunctions.

It has been shown that the dnCSPs CSP1-E1A,64 CSP2-E1Ad1083 and CSP1-E1Acyc(Dap6E10) competitively inhibit ComX induction, LytA/CbpD expression, PLY release and hemolysis, mouse mortality during acute pneumonic sepsis, and induction of ComX by moxifloxacin and clavulanate. We will test the hypothesis that dnCSPs will be efficacious in attenuating the disruption of air-blood barrier, pneumonic sepsis and lung/cardiac dysfunction, as well as enhancing the efficacy Determine the spatiotemporal induction of pneumococcal competence during pneumonic sepsis. Live imaging of D39 expressing the firefly luciferase gene fused to the promoter of ComX-regulated ssbB gene (D39-ssbB-luc) (FIG. 15) showed competence induction as early as 2 hr, lasted into 24-hr post-infection. Moreover, no signal was found in the competence-deficient ΔcomCDE-ssbB-luc strain, indicating that ssbB was specifically induced during competence. Briefly, CD1 mice (n=8/cohort, both sexes) will be intratracheally-infected with $5 \times 10^6$ CFU of D39-ssbB-luc and TIGR4-ssbB-luc, respectively. ΔcomCDE-ssbB-luc-infected mice will serve as negative controls. Infected mice will be housed separately to avoid transmission between animals. Induction of the competence regulon will be imaged at various time intervals for 96 hours. At 2 hours post-infection, and at the first sign of systemic spread (approximately 24 hours, FIG. 15), dnCSPs will be administered intratracheally and intravenously, respectively. Live imaging will be confirmed by qPCR for the expression of cbpD, lytA and cibAB genes in bacteria from lung and blood. This will establish a spatiotemporal framework for effective application of dnCSP (see below).

To determine the efficacy of dnCSPs against pneumonic sepsis. The efficacy of CSP1-E1Acyc(Dap6E10) will be examined in protecting against competence-mediated PLY and cell wall components release, preserving the integrity of air-blood barrier, and reducing sepsis and organ dysfunction. Neutralizing anti-PLY antibodies which reduce PLY concentration in BALF, preserve air-blood barrier and lower mouse mortality, as well as therapeutic concentration of amoxicillin (25 mg/kg, every 8 hours), will serve as positive controls. Briefly, CD1 mice (8/cohort, both sexes) will be intratracheally-infected with $5 \times 10^6$ CFU of D39 and TIGR4. Mice will be treated post-infection using an optimized regimen based on the spatiotemporal studies, as outlined in Table 3: CSP1-E1Acyc(Dap6E10), an irrelevant CSP1-K17A or CSP2-K17A,64,83 and a single dose anti-PLY mab antibody (HYB 041-01-02, ThermoFisher Scientific). In keeping with the good antibacterial stewardship, we aim to dose once daily (total of 3-4 doses) for the duration. At 96 hours post-infection, mice will be analyzed as described above, including attenuation in pathogenesis (e.g., reduced CFU, lower expression of cbpD, lytA, cibAB genes by qPCR; reduced PLY release in blood by ELISA, etc.), and restoration of CXCL-regulated neutrophil homeostasis. Target treatment efficacy will be compared against cohorts treated with amoxicillin and anti-PLY antibodies using pneumococcal burden in lung and in blood: Complete Response: 99% improvement bacterial clearance. Partial Response: At least a 50% improvement. Progressive Disease: At least a 20% decline in clearance. Stable Disease: bacterial burden unchanged.

TABLE 3

Infection and treatment schemes.

D39 only
D39 + 100 µg CSP1-E1Acyc(Dap6E10)
D39 + 100 µg CSP1-K17A (non-inhibitory)
D39 + 50 µg anti-PLY mAb
D39 + amoxicillin
TIGR4 only
TIGR4 + 100 µg CSP1-E1Acyc(Dap6E10)
TIGR4 + 100 µg CSP2-K17A (non-inhibitory)
TIGR4 + 50 µg anti-PLY mAb
TIGR4 + amoxicillin To determine the ability of dnCSPs in enhancing the efficacy of fluoroquinolones. Moxifloxacin and levofloxacin are considered essential antibiotics highly active against CAP pathogens, including macrolide and/or penicillin-resistant pneumococci. In addition, clavulanate, especially the pharmacokinetically enhanced amoxicillin/clavulanate (Augmentin XR‡, 2000/125 mg formulation) are widely prescribed for penicillin-resistant pneumococcus (MICs≤2 mg/L) and other β-lactamase-producing CAP pathogens (e.g. *H. influenzae*). Activation of ComX by fluoroquinolones (e.g., moxifloxacin) and clavulanate may inadvertently induce allolytic release of PLY and cell wall components into the lungs and facilitate the disruption of air-blood barrier. Particularly, this may occur in lung micro-compartments where antibacterials only reaching subinhibitory concentration, or when the concentration may be suboptimal due to patient misuse. It is hypothesized that when co-administered, dnCSPs will enhance the efficacy of moxifloxacin by reducing ComX-induced allolytic release of PLY and proinflammatory cell wall components. A live imaging study will be performed of competence induction in D39-ssbB-luc and TIGR4-ssbB-luc-infected CD1 mice (8/cohort) treated with therapeutic, subinhibitory, and non-inhibitory concentrations of moxifloxacin (Table 4) to determine the precise spatiotemporal induction of competence. After establishing the spatiotemporal parameters, CD1 mice (8/cohort, both sexes) will be infected with $5 \times 10^6$ CFU of D39 and TIGR4, respectively. Infected mice will be treated using scheme outlined in Table 4, with optimized timing. At 96 hr post-infection, mice will be analyzed as outlined above. The macrolide erythromycin, which does not induce competence, will be used as negative control at therapeutic (20 mg/kg), subinhibitory (5 mg/kg) and non-inhibitory (1 mg/kg) dosages, respectively. Antibiotic dosing and usage will be performed. It is believed that CSP1-E1Acyc (Dap6E10) will attenuate air-blood barrier disruption and enhance the efficacy of moxifloxacin.

TABLE 4

Infection and treatment schemes
[Moxi = moxifloxacin, Ery = erythromycin,
dnCSP = CSP1-E1Acyc(Dap6E10)]

D39 only
D39 + therapeutic dose of Moxi (160 mg/kg)
D39 + therapeutic dose of Moxi + 100 µg dnCSP
D39 + sub-inhibitory dose of Moxi (50 mg/kg)
D39 + sub-inhibitory dose of Moxi + 100 µg dnCSP
D39 + non-inhibitory dose of Moxi (10 mg/kg)
D39 + non-inhibitory dose of Moxi + 100 µg dnCSP
D39 + therapeutic dose of Ery (20 mg/kg)
D39 + therapeutic dose of Ery + 100 µg dnCSP
D39 + sub-inhibitory dose of Ery (5 mg/kg)
D39 + sub-inhibitory dose of Ery + 100 µg dnCSP
D39 + non-inhibitory dose of Ery (1 mg/kg)

TABLE 4-continued

Infection and treatment schemes
[Moxi = moxifloxacin, Ery = erythromycin,
dnCSP = CSP1-E1Acyc(Dap6E10)]

D39 + non-inhibitory dose of Ery + 100 μg dnCSP
TIGR4 only
TIRG4 + therapeutic dose of Moxi (160 mg/kg)
TIGR4 + therapeutic dose of Moxi + 100 μg dnCSP
TIRG4 + sub-inhibitory dose of Moxi (50 mg/kg)
TIRG4 + sub-inhibitory dose of Moxi + 100 μg dnCSP
TIGR4 + non-inhibitory dose of Moxi (10 mg/kg)
TIGR4 + non-inhibitory dose of Moxi + 100 μg dnCSP
TIGR4 + therapeutic dose of Ery (20 mg/kg)
TIGR4 + therapeutic dose of Ery + 100 μg dnCSP
TIGR4 + sub-inhibitory dose of Ery (5 mg/kg)
TIGR4 + sub-inhibitory dose of Ery + 100 μg dnCSP
TIGR4 + non-inhibitory dose of Ery (1 mg/kg)
TIGR4 + non-inhibitory dose of Ery + 100 μg dnCSP The spatiotemporal live imaging of competence induction will inform the precise timing for the administration of dnCSPs against competence-mediated allolysis and the release of PLY and cell wall components. This will maximize the efficacy of dnCSPs in attenuating air-blood barrier disruption, sepsis and damages to lung/heart. Moreover, CSP1-E1Acyc(Dap6E10) will enhance the efficacy of moxifloxacin by attenuating its ability to induce ComX-mediated allolysis.

Statistical analyses. All proposed studies in this example will involve cross comparison, internal controls and multiple bacterial strains, and authentication of in vitro results with in vivo experiments in equal ratio of male and female mice. To minimize inaccuracy, the results of all in vitro assays will be based on means of a minimum of triplicates, from three independent experiments. The number of mice to be used is based on the statistical significance of the measurement to be tested based on Power Analysis. Sample size calculations are based on an 80% power to detect a difference in the means for a two-sided test with a significance/type I error (alpha) of 0.05. Quantitative data will be expressed as the mean±standard deviation. The hypothesis of equal variances will be tested using the Levene's test. Statistical significance comparisons for samples with equal variances will be made using the parametric Student's t test for two unpaired samples and the parametric one-way ANOVA for three or more independent grouped samples. For samples with unequal variances, we will use the nonparametric Mann-Whitney U test (Wilcoxon) for two independent samples and the nonparametric Kruskal-Wallis test for three independent grouped samples. Ap value ≤0.05 will be considered significant.

While this disclosure has been described with an emphasis upon particular embodiments, it will be obvious to those of ordinary skill in the art that variations of the particular embodiments may be used, and it is intended that the disclosure may be practiced otherwise than as specifically described herein. Features, characteristics, compounds, or examples described in conjunction with a particular aspect, embodiment, or example of the invention are to be understood to be applicable to any other aspect, embodiment, or example of the invention. Accordingly, this disclosure includes all modifications encompassed within the spirit and scope of the disclosure as defined by the following claims. We therefore claim as our invention all that comes within the scope and spirit of these claims.

We claim:

1. A cyclic peptide consisting of a sequence selected from the group consisting of:

CSP1-E1A-cyc(Dap6E10)
AMRLS(DapFFRE)FILQRKK, (SEQ ID NO: 7)

CSP1-E1A-cyc(Dab6E10)
AMRLS(DabFFRE)FILQRKK, (SEQ ID NO: 7)

CSP1-E1A-des-K16K17-cyc(Dap6E10)
AMRLS(DapFFRE)FILQR, (SEQ ID NO: 16)

CSP1-cyc(K6D9)
EMRLS(KFFD)DFILQRKK, (SEQ ID NO: 8)

CSP1-cyc(K6D14)
EMRLS(KFFRDFILD)RKK, (SEQ ID NO: 10)

CSP1-cyc(Orn6D10)
EMRLS(OrnFFRD)FILQRKK, (SEQ ID NO: 11)

CSP1-cyc(Dab6D10)
EMRLS(DabFFRD)FILQRKK, (SEQ ID NO: 11)

CSP1-cyc(Dap6D10)
EMRLS(DapFFRD)FILQRKK, (SEQ ID NO: 11)

CSP1-cyc(K6E10)
EMRLS(KFFRE)FILQRKK, (SEQ ID NO: 12)

CSP1-cyc(Dab6E10)
EMRLS(DabFFRE)FILQRKK, (SEQ ID NO: 13)

CSP1-cyc(Dap6E10)
EMRLS(DapFFRE)FILQRKK. (SEQ ID NO: 13)

2. The cyclic peptide of claim 1, wherein the cyclic peptide is CSP1-EIA-cyc (Dap6EIO) AMRLS (DapFFRE) FILQRKK (SEQ ID NO: 7).

3. A composition comprising one or more of the cyclic peptides of claim 1, and a pharmaceutically acceptable carrier.

4. The composition of claim 3, further comprising one or more additional ingredients.

5. The composition of claim 4, wherein the one or more additional ingredients is an active ingredient.

6. The composition of claim 5, wherein the active ingredient is an antibiotic for a pathogen of interest.

7. The composition of claim 6, wherein the antibiotic is moxifloxacin, clavulanate or a combination thereof.

8. The composition of claim 3, wherein the composition is formulated for intranasal, intravenous, topical, enteral, parenteral, or intravitreal administration.

9. The composition of claim 8, wherein the composition is formulated for intranasal administration.

* * * * *